(12) United States Patent
Overturf et al.

(10) Patent No.: US 7,647,219 B2
(45) Date of Patent: Jan. 12, 2010

(54) EVENT-DRIVEN TEST FRAMEWORK

(75) Inventors: James M. Overturf, Murphy, TX (US); Lajos Molnar, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 655 days.

(21) Appl. No.: 11/178,570

(22) Filed: Jul. 11, 2005

(65) Prior Publication Data

US 2007/0074166 A1 Mar. 29, 2007

(51) Int. Cl.
- *G06F 17/50* (2006.01)
- *G06F 9/45* (2006.01)
- *G06F 9/44* (2006.01)
- *G06F 11/00* (2006.01)

(52) U.S. Cl. .............. 703/16; 703/17; 703/22; 716/5; 717/125; 714/38

(58) Field of Classification Search .......... 703/16, 703/27, 22; 717/125; 714/38; 716/5
See application file for complete search history.

(56) References Cited

U.S. PATENT DOCUMENTS

| | | | | |
|---|---|---|---|---|
| 5,758,062 | A * | 5/1998 | McMahon et al. | 714/38 |
| 6,163,876 | A * | 12/2000 | Ashar et al. | 716/5 |
| 6,353,896 | B1 * | 3/2002 | Holzmann et al. | 714/38 |
| 2003/0005413 | A1 * | 1/2003 | Beer et al. | 717/125 |
| 2004/0225919 | A1 * | 11/2004 | Reissman et al. | 714/38 |

OTHER PUBLICATIONS

Brockmeyer et al. "A Flexible, Extensible Simulation Environment for Testing Real-Time Specifications": IEEE Transactions on Computers, vol. 49, No. 11, Nov. 2000).*
Brockmeyer et al. "A Flexible, Extensible Simulation Environment for Testing Real-Time Specifications": IEEE Transactions on Computers, vol. 49, No. 11, Nov. 2000).*
Kim et al. "Test Cases Generation form UML State Diagrams" IEEE Proc.Softw. vol. 146, No. 4, Aug. 1999.*
Morrison, Stephen. "Integrating Discrete and Continuous Phenomona Models into Practical Advanced User Interface Specificatons", 2000.*
Beydeda et al. "An Integrated Testing Technique for Component-Based Software", IEEE 2001.*

* cited by examiner

*Primary Examiner*—Kamini S Shah
*Assistant Examiner*—Shambhavi Patel
(74) *Attorney, Agent, or Firm*—Mark G. Abyad; Wade J. Brady, III; Frederick J. Telecky, Jr.

(57) ABSTRACT

A modular instance-aware event-driven test framework is described. It includes an event-driven test framework, a transition-graph test model for the event-driven text framework, an instance-aware event-driven test framework built on said event-driven test framework and a transition-graph test model for said instance-aware event-driven test framework built on said transition-graph test model.

20 Claims, 10 Drawing Sheets

EVENT-DRIVEN TEST FRAMEWORK

COPYRIGHT NOTICE

A portion of the disclosure of this patent document contains material which is subject to copyright protection. The copyright owner has no objection to the facsimile reproduction of the disclosure, as it appears in the Patent and Trademark Office patent files or records, but otherwise reserves all copyright rights whatsoever.

FIELD OF INVENTION

This invention relates to software framework that enables testing a software system, or single or multiple components of a software system in an event driven fashion.

BACKGROUND OF INVENTION

In the prior art tests are executed using the three-phase model of initialization, execution and clean up. This makes test scheduling easy and deterministic. Each phase can succeed or fail. Most prior art testing is done sequential but most things are not sequential. In the testing of multi-media software all kinds of asynchronous events are going on such as start, play, pause, restart, resize video, etc. and a tool is needed to specify these tests in a very simple manner. It is highly desirable to be able to specify these operations in the background and one does not have to specify in the test. It is desirable that the tests should fit into the three phase test execution framework, that it is easy to add customizable functionality into framework that implements likely use cases and avoid serializing events and stepping in and out of a scheduler.

SUMMARY OF INVENTION

In accordance with another embodiment of the present invention an event-driven test framework running tests in an event-driven fashion.

In accordance with another embodiment of the present invention a transition-graph test model implements a transition-graph test model for the event-driven test framework.

In accordance with another embodiment of the present invention an instance-aware event-driven test framework is provided.

In accordance with another embodiment of the present invention a transition graph test model for an instance-aware event-driven test framework is provided.

In accordance with one embodiment of the present invention a modular instance-aware event-driven test framework is provided that comprises four modules of (1) event-driven test framework, (2) a transition-graph test model for (1), (3) an instance-aware event-driven test framework built on (1) and (4) transition-graph test model for (3) built on (2).

DESCRIPTION OF PREFERRED EMBODIMENTS

I. Modular Instance-Aware Event-Driven Test Framework

In accordance with the present invention, the system to the outside world fits the three-phase execution model of initialization (InitializeL), execution (RunTestL) and cleanup (Cleanup). This makes test scheduling easy and deterministic. Each phase can succeed or fail. Tests can be parameterized using an argument list (argc and argv), which is supplied to the initialization and execution phase. Furthermore, a test configuration object (aConfig) is passed to the initialization phase. This object may contain pointers to system objects outside of the test application. The test execution model is abstracted by a CTestAppBase class.

```
class CTestAppBase
{
public:
    // constructor, destructor
    CTestAppBase(void);
    virtual ~CTestAppBase(void);
    // 3-phase execution interface
    virtual int InitializeL(int argc, char *argv[ ],
                    TTestConfig *aConfig = NULL) = 0;
    virtual int RunTestL(int argc, char * argv [ ]) = 0;
    virtual int Cleanup( ) = 0;
};
```

Figure 1:
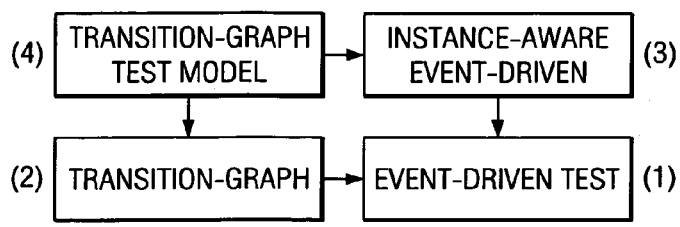
FIG. 1 is an overall diagram illustrating a modular instance-aware event-driven test framework according to one embodiment of the present invention.

Referring to FIG. 1 a modular instance-aware event-driven test framework is illustrated and described herein that enables a software system, or single or multiple components of a software system to be tested in an event driven fashion. It is comprised of the four modules of (1) the event-driven test network, (2) a transition-graph test model for (1) the event driven test framework, (3) an instance-aware event-driven test framework built on (1) the event driven test network, and (4) transition-graph test model for the (3) instance-aware event-driven test framework built on (2) the transition-graph test model. In testing software for multi-media applications there are all kinds of asynchronous events going on in the computer such as playing, stopping, parsing, resizing video, etc. A testing framework that can specify these operations in the background is highly desirable and is provided herein by the event-driven test framework (1) that allows testing when the event happens even though it is not known when it is going to happen. Every time an event occurs it goes to the event handler in the test case. The transition-graph test model (2) handles what happens when events come in. When events come in you compare events with expected events and when you get the expected events you move to the next transition and wait for the event for that transition. The instance-aware event-driven test framework (3) is used to handle multiple components such as multiple video players or audio players or both that are being tested and you want to test them in any arbitrary permutation. The instance-aware event-driven framework handles these as instances of the components. The transition-graph test model (4) extends the transition-graph to the multiple components.

II. Event-Driven Test Framework

Figure 2:
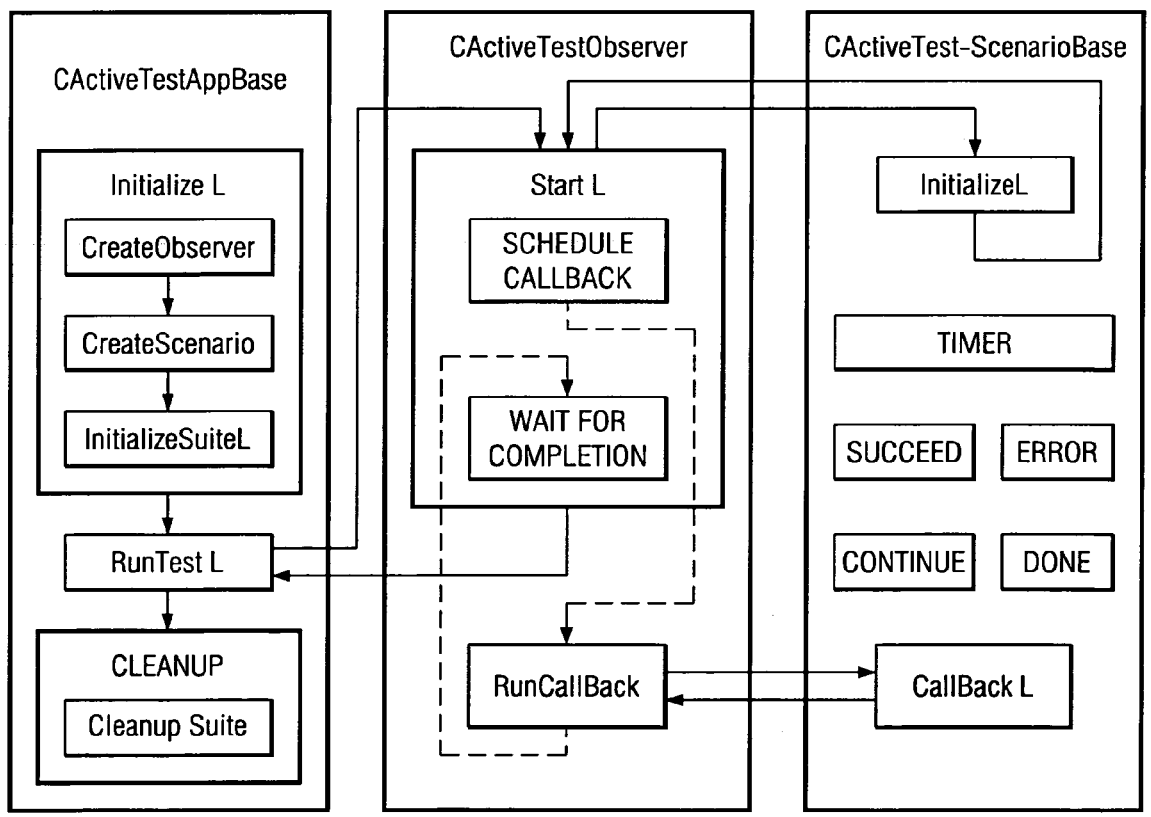
FIG. 2 illustrates the test execution model according to one embodiment of the present invention.

In accordance with one embodiment of the present invention a framework is provided that is event driven. The event driven test framework supports running tests in an event-driven fashion. When testing a system one expects events and according to this framework the event triggers some kind of action. It implements the hooks of the 3-phase execution (InitializeL, RunTestL, and Cleanup. It separates the test execution phase into two sub-phases of scenario initialization and callback. The test execution then follows the model of FIG. 2.

Applicant's have found that test cases for various parts of the system are similar to each other. It has been determined to implement test cases as parameterizable test functions (test scenarios). Further, the initialization and cleanup of test scenarios that work with similar objects is identical or nearly identical and so we can further group test scenarios into a common suite. This results in the following interfaces.

The event-driven test framework defines an interface of 4+2 methods (hooks) that must be implemented by framework users. The four (4) methods are specific to test application and the two (2) methods are specific to each test scenario implemented by the test application. These latter are specific to each test scenario implemented by the test application. These can vary from one test scenario to another.

CreateObserver: this method must create and return the test observer.

CreateScenario: this method must create and return the test scenario object to be run (it's inputs are the specific scenario's name).

InitializeSuiteL: the new application-specific initialization hook (this may return an error value if initialization failed).

CleanupSuite: the new cleanup hook.

These hooks provide test-suite specific customization points for the tests. In addition, the scenario objects must implement two methods.

InitializeL: scenario specific initialization. (This may return an error value if initialization failed.)

CallBackL: the scenario's callback method (all test operations after initialization are done as a response to a callback event). This method is called in response to an event in the system, and it must return true only at the end of the test (whether it succeeds or fails). At all other times it must return false. Testing is stopped at the first true return value; however, more events (and therefore more callbacks) may be processed before the testing completes.

The Event-Driven Test Framework has three object oriented programming classes of test application base (CActiveTestAppBase), the test scenario base (CActiveTestSceenario Base) and the test observer (CActiveTest Observer). In object oriented programming a class is a user defined data type that defines a collection of objects that share the same characteristics.

It also defines one data type called the test event (TActiveTestEvent) and one interface known as the observer interface (CActiveObserver). The data type describes an overview of which event is specified. There is an observer interface so we can observe events in any work. It has one callback. For everything you want to trap as an event you need to create an observer that implements callback. A lot of functionality is provided but one has to customize it.

Classes

TActiveTestEvent (Base Data Type)

TActiveTestEvent (Base Data Type) data structure to follow encapsulates the data regarding the event. Each tested event in the system has to be captured as a TActiveTestEvent. A base class is implemented for the event type, which supports the Initialization and Timer events, and defines the comparison method (Matches).

```
Class TActive TestEvent
{
public:
    Tint      i Type
    TBool     iNotification;
    TActiveTestEvent (Tint a Type);
    ~TActiveTestEvent( );
    virtual TBool Matches (TActiveTest Event &aEvent);
    virtual void Print (TLogMask=ElogEvent);
};
```

CActiveObserver (Interface)

The CActiveObserver (Interface) interface to follow is the basic observer interface. It defines the RunCallBackL method signature, which is used to call the test scenario's callback function. This is an internal definition, and is not designed for use by the framework user.

```
Class CActiveObserver
{
protected:
    CActiveObserver( );
    ~CActiveObserver( )
    virtual void RunCallback(TActiveTestEvent &aEvent)=0;
};
```

CActiveTestObserver(Base Class)

The following CActiveTestObserver(Base Class) is the main test observer for the event-driven test scenario. It implements the scheduling of the event-driven tests, and provides Timer and Initialization events to the test scenario. The Timer also ensures the test there is always an outstanding event so that the test execution completes. It also provides helper functions to specify the test result: Done (result). These functions can be used from or via an observer.

```
Class CActiveTestObserver ;public CTimer, CActiveObserver
{
private:
    // instance variables
    CActiveTestScenarioBase  *iScenario;    // scenario object
    TInt                     iScheduled;    //# of timers scheduled
    TInt                     iResult;       // test result
    TInt                     iLeave;        //test leave
    TBool                    lDone;
    // friend classes and methods
    friend TBool CActiveTestScenarioBase : : Timer (Tint); // iScheduled
    friend CActiveLinkedObserver;
public:
    // constructor, destructor
    CActiveTestObserver (TInt aPriority= CActive:: EPriorityStandard);
    ~CActiveTestObserver( );
    // methods
    TInt StartL (CActiveTestScenarioBase *a Scenario, Tint argc,
            TText*argv[]);
    //implementation of callbacdk interface
    virtual void RunCallback (TactiveTestEvent & aEvent);
public:
    // helper methods
    inline TBool Done (Tint a Result);
    inline TBool Succeed( );
    inline TBool HasFailed (void);
private:
    // timeout callback
    virtual void RunL( );
};
```

CActiveTestScenarioBase (Abstract Base Class)

This CActiveTestScenarioBase (Abstract Base Class) class defines the event-driven test scenario interface: InitializeL and CallBackL. It implements the basic timer callback functionality (Timer). There always has to be an outstanding timer event scheduled to ensure that the Callback will be called. This requirement is enforced by the framework. The timer event can be used for timeout purposes. It also provides helper functions to specify the test result: Continue, Error, Done, and Succeed.

```
class CActiveTestScenarioBase : public CTestAppBase
{
protected:
    // instance variables
    TInt                iState;         // state
    CActiveTestObserver  *iObserver;    // observer object
public:
    // constructor, destructor
    CActiveTestScenarioBase ( );
    ~ CActiveTestScenarioBase ( );
    // methods
    void SetContext (CActiveTest Observer *aObserver);
    // test scenario interface
    virtual TBool Initialize (Tint argc, TText *argv[ ]) =0;
    virtual TBool CallBack (TActiveTestEvent &aEvent)= 0;
public:
    // helper methods
    inline TBool Done (Tint a result);
    inline TBool Succeed( );
    inlineTBool Error (Tint a Error);
    inline TBool Continue( );
    inline TBool Timer (Tint ms);
};
```

CActiveTestAppBase (Abstract Base Class)

This CActiveTestAppBase (Abstract Base Class) is the base class for event-driven test applications (test suites). It implements the external test execution interface (CTestAppBase) and defines the event-driven test application interface (CreateScenarioL, CreateObserverL, InitializeSuiteL and CleanupSuite).

```
Class CActiveTestAPPBase : public CTestAppBase
{
protected:
    // instance variables
    CActiveTestObserver      *iObserver;    // observer object
    CActiveTestScenarioBase  *Scenario;     // scenario object
    // test application interface
    virtual CActiveTestObserver * CreateObserverL( ) = 0;
    virtual Tint InitializationSuiteL (Tint argc, TText *argv[ ],
        TTEstConfig *Config) = 0;
    virtualCActiveTestScenarioBase * CreateScenario (TDesC &
        aName) = 0;
    virtual Tint CleanupSuite ( ) = 0;
public:
    // constructor, destructor
    CActiveTestAPPBase( );
    Virtual ~CActiveTestAppBase ( );
    // implementation of 3-phase execution interface
    virtual int InitializeL (int argc, char * argv[ ], TTestConfig
    *Config);
    virtual int InitializeL (int argc,char *argv[ ]),
    virtual int Cleanup( );
};
```

Figure 3:
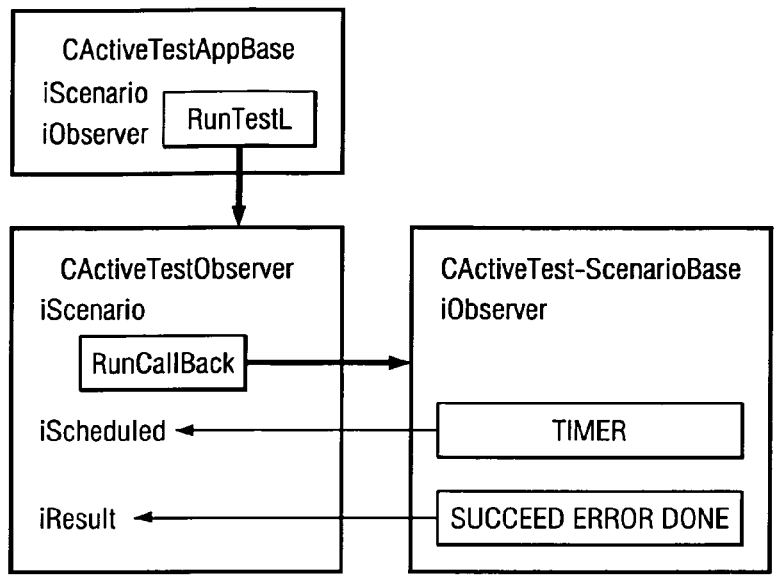
FIG. 3 illustrates how test objects are given access to each other during testing.

The test objects need to have access to each other to do the callback, set the test result, as well as to ensure that there is always an outstanding timer event. As illustrated in FIG. 3 the test application creates both the test observer and the test scenario. At the point of creation, none of them has access to the other object. In RunTestL, test application passes the test scenario into the test observer's StartL method, giving it access to the scenario. In StartL, the observer reveals itself to the scenario (calling it's SetContext method).

After processing Callbacks, the framework checks if there is an outstanding timer event by keeping track of the timer events when scheduled, and when processed.

Events received after test completion or test failures are ignored. No further callbacks are processed after completion or test failure. If one needs to test stray signals after test completion or at object detection, one can add schedule a timer transition (and object deletion) at the end of the test and catch stray events.

Detailed Design/Operations

1. TActiveTestErrorType Enumeration

The following enumeration defines Event-Driven Test error values enum TActiveTestErrorType

```
enum TActiveTestErrorType
{
    EFailNoCallBack = 0x8011.
    EFailNoTimerScheduled,
    EFailNoResultSpecified,   // scenario completed without
                              // specifying result
    EFailInvalidInstance      // instance not found
    EFailInvalidTransition    // transition id not found
};
```

2. TActiveTestEventType Enumeration

These TActiveTestEventType enumerations are the event types supported by CActive Test Observe. One can create their own event types for their observer, but one must start their enumeration from ELastActiveEvent enum TActiveTestEventType

```
enum TActiveTestEventType
{
    EEventNone,
    EEventDefault,
    EEventInit,
    EEventTimer,
    ELastActiveEvent,
};
```

3. TActiveTestEvent Class

This TActiveTestEvent class is the base class for the event data in Active Tests. It only contains the event types. All event classes must be derived from this class to be supported by CActiveTestAPPBase (due to CActiveTestObserer). The instance variable iNotification is used by the Transition-graph Test Model, but can be used by other test models as well.

a) Constructor

TActiveTestEvent (TInt a Type)

```
TActiveTestEvent (TInt a Type)
{
    Set my iType to aType.
    Set my iNotification to False
}
``` b) Destructor

An Empty destructor means nothing to do. Can be overridden and customized by framework user.

c) Matches Method

Effects: returns whether this event matches the supplied event.

Virtual TBool Matches (TActiveTestEvent & aEvent)

```
Virtual TBool Matches (TActiveTestEvent & aEvent)
{
    return whether (my iType) equals (aEvent's iType).
        d) Print Method
    Effects: prints out the event in a maskable fashion (aMask)
    virtual void Print (TLogMask a Mask =ELogEvent)
    {
        Print out test event details in a maskable fashion using aMask.
    }
}
```

4) PrintEvent Method

PrintEvent method effect: prints out an event (aEvent) in a maskable fashion (aMask)

void PrintEvent (TActiveTestEvent*aEvent, TLogMask a Mask=ELogEvent)

```
void PrintEvent (TActiveTestEvent * aEvent, TLogMask a Mask = ELogEvent)
{
    If (aEvent exists)
        THEN Call aEvent->Print (aMask)
        Else Print out "none".
}
```

5) EvNull

EvNull is Shorthand for a new NULL event.

define EvNull new TActiveTestEvent (EEventNone)

6) EvDEFAULT

EvDEFAULT is Shorthand for a new default event. This can mark a default event for a given operation, and is used by the function-transition model.

define EvDEFAULT new TActiveTestEvent (EEventDefault)

7) CActiveTestScenarioBase Class

This CActiveTestScenarioBase class is the base class for event-driven test scenarios.

a) Constructor

CActiveTestScenerioBase ( )

```
CActiveTestScenarioBase( )
{
    Set my iState to 0.
    Set my iObserver to empty (NULL).
}
``` b) Destructor

An empty destructor means nothing to do. Can be overridden and customized by framework user.

c) SetContext Method

A reference to the test observer (aObserver) is passed to the scenario using this method. This function is provided because it is common to al scenarios, and it allows a scenario constructor with no arguments).

void SetContext (CActiveTestObserver *aObeserver)

```
void SetContext (CActiveTestObserver *aObserver)
{
    Set my iObserver to a Observer.
}
``` d) InitializeL Method (Abstract)

The InitializeL Method (Abstract) is implemented by the framework user. It is used to initialize the test scenario based on the test arguments list (argc contains the number of argument, and argv is the array of arguments). It must return true if the test scenario is done (failed or succeeded), or false if the callback phase of the scenario has to be scheduled. Note: a result must be specified using the Done, Error or Succeed methods before returning true.

virtual TBool InitializeL (Tint argc* aegv[ ])=0 e) CallbackL Method (Abstract)

CallbackL method (Abstract) is implemented by the framework user and it must implement the callback (response to event aEvent) phase of the test scenario. It is called for each event received and must return true and false under the same guidelines as the InitializeL method. Note: there must be an outstanding event when returning false. This ensures that there is always a further callback if the test scenario is not yet finished (failed or succeeded).

virtual TBool CallbackL (TActiveTestEvent &aEvent)=0;

f) Result/Completion Methods

These methods record the test result, and then return true. This is used when the test scenario is complete. These are short hands for calling the identical method on the test observer.

Inline Tbool Done (TIint a Result)

```
Inline TBool Done (TInt a Result)
{
    Call iObserver-> Done (aResult).
    Return True.
}
inline TBool Succeed( )
{
    call iObserver->Succeed.
    Return True.
}
```

If the result is not yet specified, it records KErrNone. Use when test scenario succeeded. The Error method is identical to done and is provided for readability. The Continue method simply returns false and is provided for readability.

g) Timer Method

The Timer method sets up a timer event (EEventTimer) in milliseconds (ms) from now and returns false. This allows it to be simply returned in the callback phase (meaning testing continues).

inline Tbool Timer (TInt ms)

```
inline TBool Timer (TInt ms)
{
    using iObserver's timer object: {
        Cancel any outstanding timer scheduled if any.
        Schedule an outstanding timer in ms
    }
    Increment iObserver's iScheduled counter.
    Return False.
}
```

8. CActiveTestObserver Class

CActiveTestObserver class is the base class for the observer in event-driven tests. It includes a timer object for scheduling callbacks. It also implements the CActiveObserver interface.

a) Constructor

CActiveTest Observer (TInt aPriority=standard priority

```
CActiveTest Observer (TInt aPriority = standard priority
{   Set my iScheduled to 0.
    Set my iResult to 0.
    Set my iLeave to 0.
    Set my iDone to False.
    Set my iScenario to NULL (empty).
    Allocate a timer with priority aPriority.
}
``` b) Destructor

Destroy the allocated timer.

c) Start Method

Effects: runs a test scenario (aScenario) using the argument list (argc contains the number of argument, and argv is the array of arguments) and returns the result.

Details: It schedules a timer immediately and then waits for a scenario completed signal. When the signal is received (test scenario completes with a result), it returns the test result.

```
TInt StartL(CActiveTestScenarioBase *aScenario, TInt argc, TText *argv
[ ])
{
    // pass the observer
    Call aScenario->SetContext(this).
    // initialize test results
    Set my iResult to No-Result-Specified.
    Set my iLeave to None.
    // initialize scenario
    Call aScenario->InitializeL(argc, argv).
    IF (it returns false) THEN
    {
        // initialization did not complete scenario
        Set my iScenario to aScenario.
        Increment my iScheduled counter.
        // mark first callback
        // Note: Subsequent callbacks will leave this 0
        Set my iLeave to UNDEFINED.
        Schedule a timer event for NOW.
        Wait for Test-Scenario-Completed signal.
        // Note: this also allows the scheduled timer event to happen
    }
    IF (my iLeave is not None) THEN
    {   // exception occurred
        Leave with iLeave exception.
    }
    ELSE
    {   // otherwise, return result
        Return my iResult.
    }
}
``` d) RunCallBack Method

RunCallBack method runs the scenario's callback function in response to an event (aEvent). If the test scenario callback leaves with an exception, it stores the exception value. If it returns True (scenario is complete), or if it left, it sends a Test-Case-Completed signal. This method also checks whether a timeout is scheduled, and it sets the leave value to EFailNoTimerScheduled (and sends the Test-Case-Completed signal) if it is not. Note: It is possible that events are processed even after the Test-Case-Completed signal. Therefore, the scenario's CallBackL method must be able to respond to events after it returned True, e.g. to set the test result to an error. This can be used to catch stray signals after testing has completed. By moving step 2 before 1, this behavior can be eliminated. Usage: Use this method to call the callback function from a derived observer class

```
virtual void RunCallBack(TActiveTestEvent &aEvent);
{
    Set stop to False;
    // call callback in an exception trap
1.  Call iScenario->CallBackL(aEvent).
    Store result in stop, and any exception value in iLeave (None if no
exception happened).
    // If we've already signaled the end of the test case (iDone), we
    // simply return-values are changed at this point
```

-continued

```
2.  IF (my iDone is True) THEN Return.
    // Note: The test case completes if there was an exception
(iLeave), the callback returned True (stop).
    // In all other cases a timer must be scheduled.
    // If this is NOT the case, we set the exception (iLeave).
    // Note: This will result in an exception thrown in StartL
    IF (NOT (my iLeave OR stop OR my iScheduled))
        THEN iLeave = EFailNoTimerScheduled.
    // signal end of test when complete
    IF (my iLeave OR stop) THEN
    {
        Signal Test-Scenario-Completed.
        Set my iDone to True.
    }
}
``` e) Result/Completion Methods

The test observer provides two result/completion methods. Done records the test result (aResult) and returns True. Succeed sets the test result to OK if it is still No-Result-Specified (it will not overwrite a potential error value). Succeed also returns True.

```
inline TBool Done(TInt aResult)
{
    Set my iResult to aResult.
    Return True.
}
inline TBool Succeed( )
{
    IF (my iResult is No-Result-Specified)
    THEN Set my iResult to OK.
    Return True.
}
``` f) HasFailed Method

The HasFailed observer method returns whether the test scenario result is NOT OK. This can be used to check if the scenario has already failed.

inline TBool HasFailed(void)

```
inline TBool HasFailed(void)
{
    Return whether (my iResult) does not equal to (OK).
}
``` g) RunL Method

RunL is the timer callback method. It implements the timer (EEventTimer) and the initialization (EEventInit) events.

```
virtual void RunL( )
{
    Decrement my iScheduled counter.
    IF (my iLeave is UNDEFINED)
    THEN Call my RunCallBack(EEventInit event)
    ELSE Call my RunCallBack(EEventTimer event).
}
```

9. CActiveTestAppBase Class

CActiveTestAppBase class is the base class for event-driven test applications. It implements the RunTestL method which requires iScenario to be initialized, and calls the scenarios initialize and callback phases. It abstracts Initialize-SuiteL and CleanupSuiteL to do suite specific initialization and cleanup. Basic initialization and cleanup is done in the implemented InitializeL and CleanupL methods. It also defines a CreateObserverL method that must return the created observer for the test application, and a CreateScenario method that must return the specified scenario object.

```
CActiveTestObserver      *iObserver;   // observer object
CActiveTestScenarioBase  *iScenario;   // scenario object
``` a) Constructor

The default constructor sets the iObserver, iScenario variables to Null (empty).

b) Destructor

```
Effect: Frees up objects
virtual ~CActiveTestAppBase( );
{
    delete my iObserver object if not empty;
    delete my iScenario object if not empty;
})
``` c) CreateObserverL Method (Abstract)

The CreateObserverL method (Abstract) must be implemented by the framework user. It must create and return the test observer for the test application.

virtual CActiveTestObserver *CreateObserverL( )=0;

d) InitializeSuiteL Method (Abstract)

The InitializeSuiteL method must be implemented by the framework user. It must perform the initialization of the test app using the test scenario arguments list (argc and argv), and the test configuration structure (aConfig). It must return OK if initialization is successful or an error result otherwise. Note: This is initialization beyond the generic test suite initialization (e.g. scenario, observer, etc.) which is implemented in InitializeL.

virtual TInt InitializeSuiteL(TInt argc, TText *argv[ ],
    TTestConfig *aConfig)=0;

e) CreateScenario Method (Abstract)

The CreateScenario method (Abstract) must be implemented by the framework user. It must create and return the test scenario object corresponding to the scenario name (aName). It can return Null (empty) if no scenario matches the name.

virtual CActiveTestScenarioBase *CreateScenario(TDesC
    &aName)=0;

f) CleanupSuite Method (Abstract)

The CleanupSuite method must be implemented by the framework user. It must perform the cleanup of the test application. It must return OK if cleanup is successful, or an error result otherwise. Note: This is cleanup beyond the base test-suite cleanup (e.g. scenario, observer, etc.) which is implemented in Cleanup.

virtual TInt CleanupSuite( )=0;

g) InitializeL Method

The InitializeL method implements the $1^{st}$ phase of the 3-phase test execution interface. It initializes the test suite, creates the observer and scenario objects. It also calls InitializeSuiteL, and returns any error value.

virtual int InitializeL(int argc, char *argv[ ], TTestConfig *aConfig)

```
virtual int IntializeL(int argc, char *argv[ ], TTestConfig *aConfig)
{
    // create observer
    Call my CreateObserverL( ).
    Store result in my iObserver.
    IF (my iObserver is empty)
    THEN Leave with App-Creation-Failure exception.
    // choose the appropriate scenario
    Set name to the 1st argument in the argument list.
    Call my CreateScenario(name)
    Store result in my iScenario.
    if (my iScenario is empty)
    THEN Leave with App-Unknown-Scenario exception.
    // initialize test suite
    Call my InitializeSuiteL(argc, argv, aConfig);
    Return result.
}
``` h) RunTestL Method

The RunTest method implements the 2nd phase of the 3-phase test execution interface. It runs the test scenario and returns the result.

virtual int RunTestL(int argc, char *argv[ ])

```
virtual int RunTestL(int argc, char *argv[ ])
{
    Call iObserver->StartL(my iScenario, argc, argv).
    Return result.
}
``` i) Cleanup Method

The cleanup method implements the 3rd phase of the 3-phase test execution interface. It cleans up the base test suite objects. Also calls CleanupSuite.

virtual int Cleanup( )

```
virtual int Cleanup( )
{
    // we need to delete the scenario before Cleanup happens
    Delete my iScenario object unless it is empty.
    Set iScenario to Null (empty).
    Call my CleanupSuite;
    Return result.
}
```

III. Using the Event-Driven Test Framework

This section describes how the Event-Driven Test Framework can be used (customized) to test various systems. It has two sections: a text-book example, and a life-like example. The text-book example provides example code for using the framework in a simple environment. The life-like example shows customization of the framework in a life-like situation. For space considerations only flow-charts are given.

a. Text-Book Example

Creating an event-driven test is simple with the event-driven test framework.

Step 1: Create an event-driven test application. In the test application, implement the event-driven test application interface.

```
class CMyTestApp : public CActiveTestAppBase
{
protected:
    virtual CActiveTestObserver*     CreateObserverL( );
    virtual CActiveTestScenarioBase* CreateScenario(TDesC &aName);
    virtual TInt InitializeSuiteL(TInt argc, TText *argv[ ], TTestConfig *aConfig);
    virtual TInt CleanupSuite( );
};
```

Make sure you create your test application instance. For ATF you can do this:

```
CTestAppBase *CTestAppBase::CreateTestApp( )
{
    return new CMyTestApp( );
}
```

Step 2: perform test suite initialization in InitializeSuiteL, and any cleanup in CleanupSuite.

```
TInt CMyTestApp::InitializeSuiteL(TInt /*argc*/, TText *argv[ ], TTestConfig *aConfig)
{
    // ... insert initialization here ...
    return ETestErrorNone;    // return OK/error
}
TInt CMyTestApp::CleanupSuite( )
{
    // ... insert cleanup here ...
    return ETestErrorNone;    // return OK/error
}
```

Step 3: create an observer (one can use the default CActiveTestObserver, if one need only timer event). Otherwise, create your own.

```
class CMyTestObserver : public CActiveTestObserver
{
};
CActiveTestObserver *CMyTestApp::CreateObserverL( )
{
    return new CMyTestObserver( );}
```

Step 4: create your test scenario(s). Derive a class from CActiveTestScenarioBase and implement the initialization and callback methods.

```
class CMySceanario001 : public CActiveTestScenarioBase
{
    TInt iTimes, iDelay; // scenario state
public:
    virtual TBool InitializeL(int argc, TText *argv[ ])
    {
        // Ensure we have the correct number of arguments
        if (argc != 3) return (Error(ETestAppScenarioParamListError));
        TLex((TText *) argv[1]).Val(iTimes); // parse the 1st and 2nd arguments
        TLex((TText *) argv[2]).Val(iDelay);
        // initialization succeeded, continue to callbacks.
        return (Continue( ));
    }
```

-continued

```
virtual TBool CallBackL(TActiveTestEvent &aEvent)
{
    // first check initialization event
    if (state == 0 && aEvent.iType == EEventInit)
    {
        // perform initialization if necessary
        // schedule next event, e.g. timer, or operation with event.
        Timer (iDelay);
    }
    // check expected events depending on state
    else if (state < iTimes && aEvent.iType == EEventTimer)
    {
        // schedule next event
        Timer(iDelay);
    }
    // return Succeed from the last event in the test
    else if (state == iTimes && aEvent.iType == EEventTimer)
    {
        return Succeed( );
    }
    // return error if receive unexpected event. You may want to print out a debug message here
    else return (Error(KErrGeneral));
    // increment state and return Continue( ) (or false) to keep testing.
    iState++;
    return Continue( );
}
};
```

Step 5: implement the scenario selector. One needs to return a new instance of the correct scenario based on the name passed in. This name is argument 0 of test argument list.

```
CActiveTestScenarioBase
*CMyTestApp::CreateScenario(TDesC &aName)
{
    if (!aName.CompareF(_L("S000")))           return new CMySceanario001( );
    else if (!aName.CompareF(_L("scenarioName2")))  return new ...
    ...
    else return NULL;
}
```

Now one can call this test case using the following input arguments: argc=3, argv[ ]={"S000", "<# of times to wait>", "<timer delay>"};

If you want to accept other events, you either need to use multiple inheritance or a linked observer. Perhaps, you are using an object X which defines a callback interface CXObserverInterface. If it is truly an interface, you can simply implement this interface in CMyTestObserver:

```
class CMyTestObserver : public CActiveTestObserver,
CXObserverInterface
{
    CXEvent1(void *data) {
        // create test event
        TActiveTestEvent event;
        event.type = EXEvent1;
        event.data = data;
        RunCallBackL(event);
    }
};
```

If it is not a true interface (e.g. CXObserver derives from other base classes), one can implement an observer as a linked observer:

```
class CMyTestObserver : public CXObserver
{
private:
    CActiveTestObserver *mainObserver;
public:
    CMyTestObserver(CActiveTestObserver *aMainObserver, ...) :
    mainObserver(aMainObserver), ...
    { ... }
    CXEvent1(void *data) {
        // create test event
        TActiveTestEvent event;
        event.type = EXEvent1;
        event.data = data;
        mainObserver->RunCallBackL(event);
    }
};
```

You then need to tie this linked observer into test suite, and make sure that it gets created before testing and deleted afterwards. Note, that you have access to the main observer in InitializeSuiteL as well as in the scenario's InitializeL method (iObserver).

b. Life-Like Example

Here is how the Event-Driven Framework can be used to test an audio decoder. In this example we assume that the audio decoder implements the following interface:
Initialize—initialize decoder
Decode—start playing
BufferFilled—pass buffer to decode
EndOfStream—end-of-stream reached; must be called before passing last buffer of the stream.

It's observer interface includes the following methods:
Error—error during decoding or initialization
Initcomplete—initialization completed
NeedBuffer—provides an empty buffer to fill
Stopped—decoding stopped TestApp Extends CActiveTestAppBase. TestScenario1 Extends CActiveTestScenarioBase.

TestObserver

Figure 4:
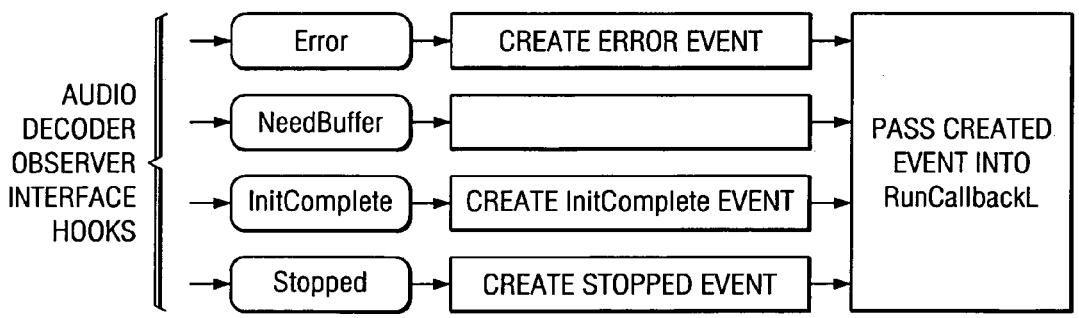
FIG. 4 illustrates the TestObserver.
Figure 5:
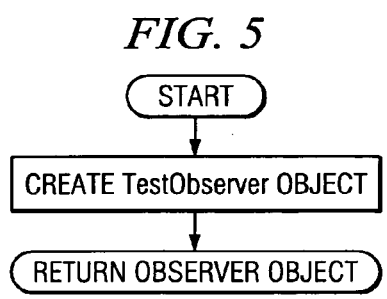
FIG. 5 illustrates TestAPP::CreateObserver.
Figure 6:
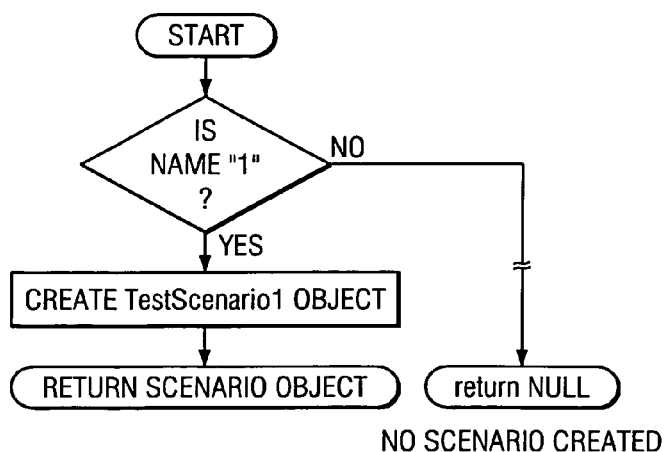
FIG. 6 illustrates TestAPP::CreateScenario.
Figure 7:
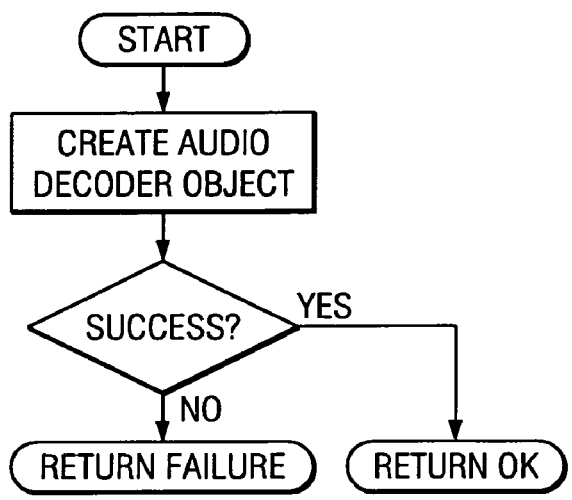
FIG. 7 illustrates TestAPP::InitializeSuiteL.
Figure 8:
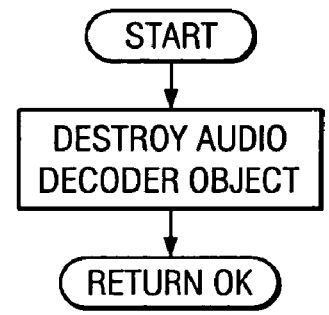
FIG. 8 illustrates TestAPP::CleanupSuite.
Figure 10:
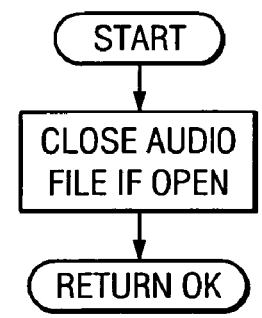
FIG. 10 illustrates TestScenario1::Destructor.
Figure 11:
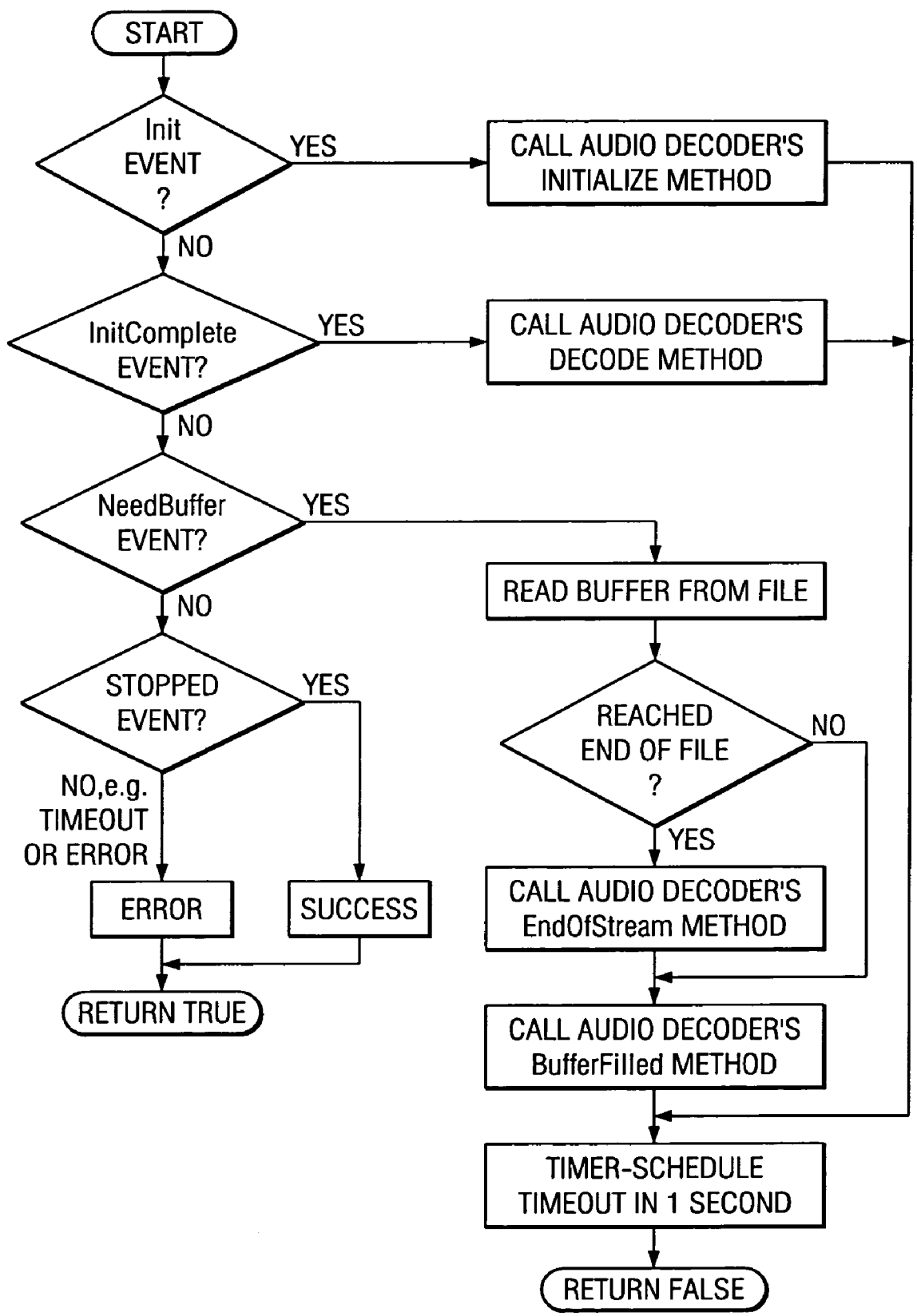
FIG. 11 illustrates TestScenarion1::CallBackL.

The TestObserver extends CActiveTestObserver, as well as implements the audio decoder's observer interface (Error, NeedBuffer, InitComplete, and Stopped callbacks). See FIG. 4. See FIG. 5 for TestApp::CreateObserver. See FIG. 6 for TestApp::CreateScenario. See FIG. 7 for TestApp::InitializeSuiteL. See FIG. 8 for TestApp::CleanupSuite. See FIG. 9 for TestScenario1::InitializeL. See FIG. 10 for TestScenario1::Destructor. See FIG. 11 for TestScenario1::CallBackL.

IV. Transition-Graph Test Model for the Event-Driven Test Framework

Figure 12:
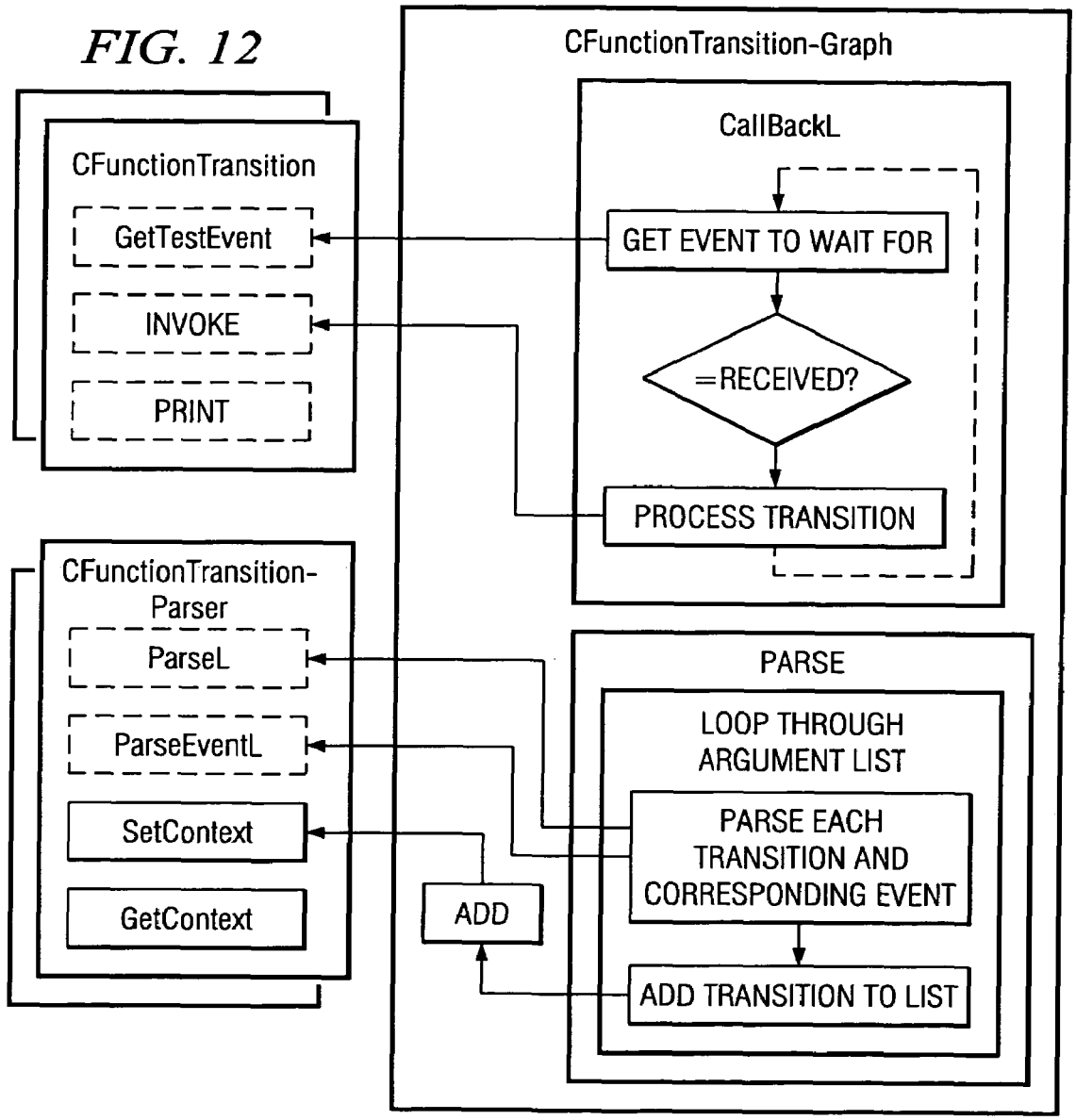
FIG. 12 illustrates the transition-graph test model for the even-driven test framework.
Figure 13:
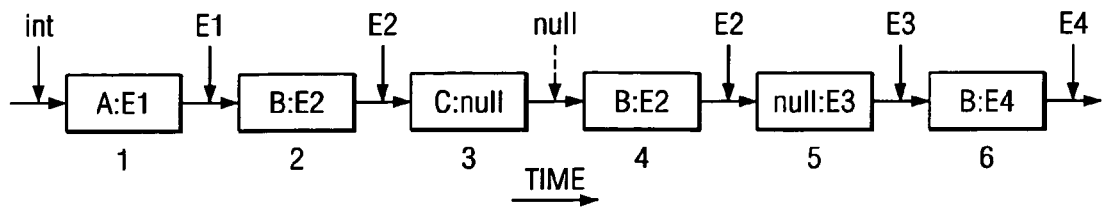
FIG. 13 illustrates a linear transition graph that consists of transitions that can be triggered by event.

The transition-graph test model implements a simple linear transition-graph test model for testing. See FIG. 12. When events come in we compare events with expected events and when you get expected events the system moves to the next transition and wait for the next event. It implements a CallbackL method that can be used by the test scenario. In addition, it allows test scenarios to be specified in a text file. The transition-graph framework provides the basis for the instance-aware transition framework as well. It provides three classes and other helper functions. A linear transition graph consists of transitions that can be triggered by events. The transitions are ordered in a list as illustrated in FIG. 13. At each transition an event and an operation is specified. The transition graph in FIG. 13 corresponds to the following scenario:

1. upon the initialization event
2. perform operation A
3. wait for event E1
4. perform operation B
5. wait for event E2
6. perform operation C
7. perform operation B
8. wait for event E2
9. wait for event E3
10. perform operation B
11. wait for event E2
12. test scenario complete.

Both the events and operations can be null, in which case no operation or wait is performed. Also note that the order is strictly enforced. At step 8, if event E3 comes before E2, the test scenario will fail.

Figure 14:
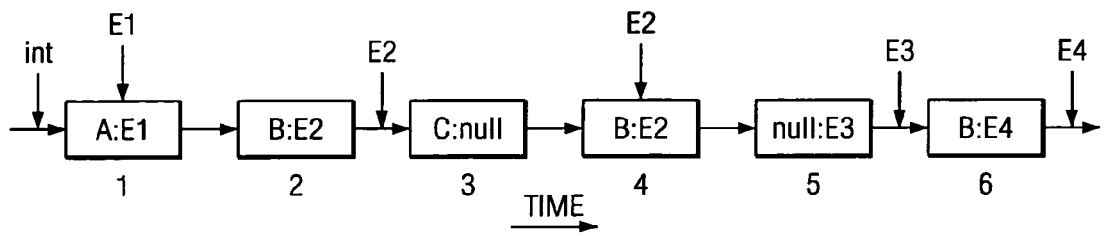
FIG. 14 illustrates a test scenario that succeeds where the event occurs during the transition.
Figure 15:
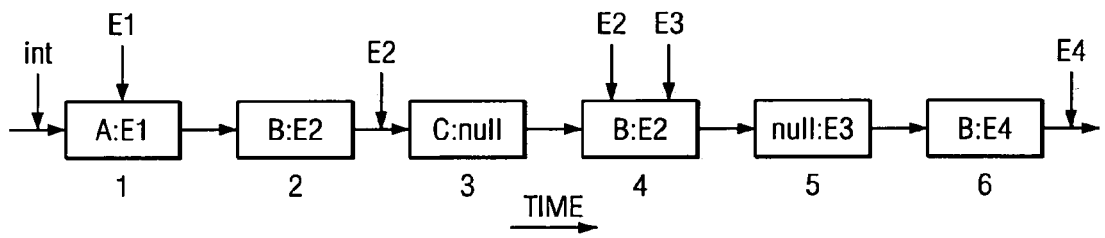
FIG. 15 illustrates another test scenario that succeeds where the event for a null operation can occur during the previous operation, but they have to come in order.
Figure 16:
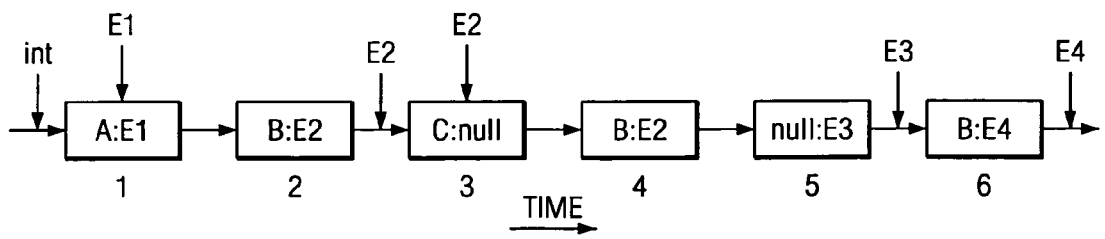
FIG. 16 illustrates a test scenario that fails where the even occurred to early.
Figure 17:
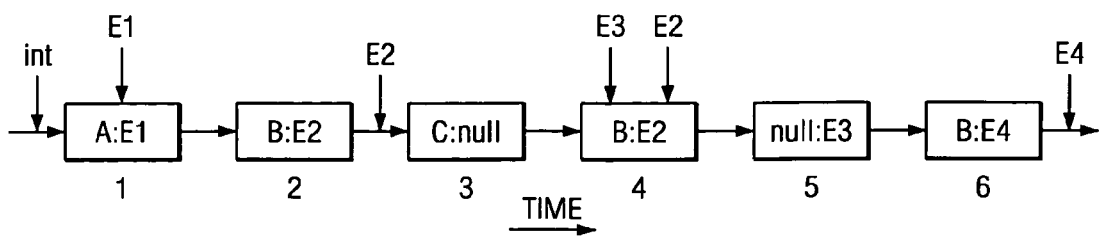
FIG. 17 illustrates a test scenario that fails because the event occurred out of order.
Figure 18:
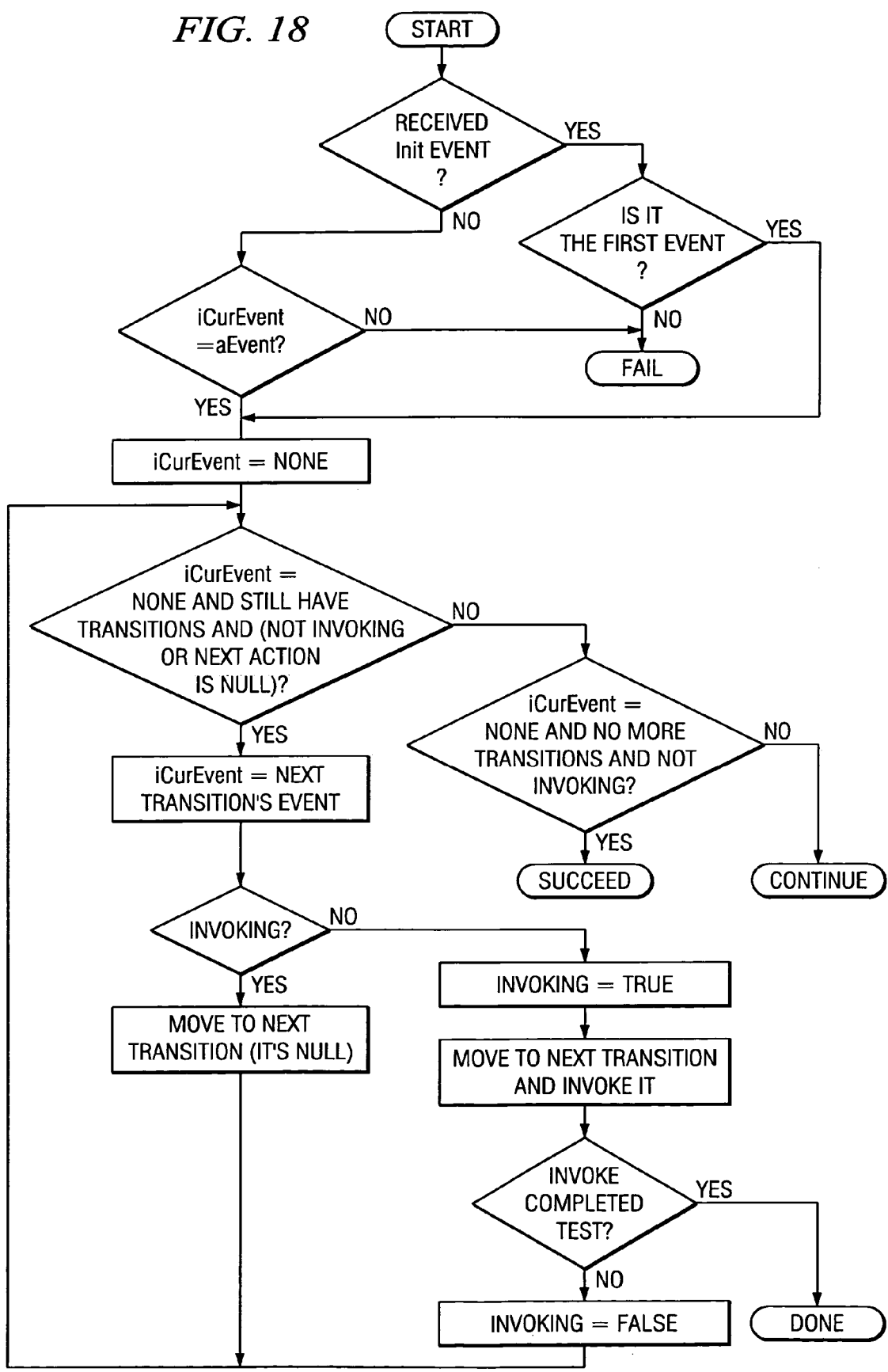
FIG. 18 illustrates a flow chart of a transition-graph test model implementation according to one embodiment of the present invention.

Also note that events can happen anytime from the processing of the last event, during the transition, or after the transition. However, events are not queued. Yet, if a null operation follows a transition, the corresponding event can be processed even while the prior transition is executed. FIGS. 14 and 15 illustrate scenarios that succeed. In FIG. 14 the event occurs during the transition and in FIG. 15 an event for a null-operation can occur during the previous operation, but they have to come in order. The events in FIGS. 16 and 17 fail. The event in FIG. 16 fails because an event occurred too early (during transition 3, although specified in transition 4). In FIG. 17 the events occurred out of order.

Each transition (operation) has a default event, which is the expected event for the operation. In order to make writing scenarios quicker, the default event is used if no event is specified. If the transition should wait for no event after the operation, a null event must be specified. For most operations, a null event must be specified. For most operations the default event is no event, so omitting the event results in a null-event, but strictly because it is the default event for the operation. The transition-graph model includes two support functions to create a Null event (no event), and a Default event: EvNULL and EvDEFAULT, which are macros for creating a new event. Note, the EvDEFAULT can be omitted, as it is the default. The use of the default event creates a dual interpretation for the event. When creating function transitions (in the constructor): a NULL value refers to the default event. During the construction, these NULL values are replaced by an EvDEFAULT event instances. The null-events in turn are replaced by the NULL value to speed up processing. Inside the function transition methods, NULL refers to null-events, and the function transition converts the "default event" into the actual event that is the default for the transition operation.

Interfaces

The transition-graph test model defines 3+2 methods that must be customized (or overwritten) by framework users. 3 methods define the behavior of transitions, 2 methods implement the parsing of transitions and events. A default implementation for each of these interfaces supporting the basic events (EEventTimer and EEventNull) is provided with the framework. The transition interfaces are:

GetTestEvent: this method must return the test event associated with a transition object. Customization is required for specifying the default event for a transition.

Invoke: this method must perform the transition for the transition object. It returns True if the transition completed the test (e.g. error, or early completion), or False if more transitions/events need to be processed.

Print: this method must print the details of the transition object.

The Parsing interfaces are:

ParseL: This method must check if there is a recognized and valid transition in the argument list at the specified index. If there is one, it must advance the index to the end of the transition description, and return the transition object. Otherwise, it must keep the index in place, and return Null (empty object).

ParseEventL: This method must check if there is a recognized and valid event in the argument list at the specified index. If there is one, it must advance the index to the end of the event description, and return the event object. Otherwise, it must keep the index in place, and return Null (empty object).

Classes

The Transition-graph Test Model for the Event-Driven Test Framework has 3 classes: the transition class (CFunctionTransition), the transition-graph class (CFunctionTransitionGraph), and the transition-parser class (CFunctionTransitionParser).

1. CFunctionTransition (Base Class)

```
Class CFunctionTransition  :    public CBase
{
    // friend classes
    friend class CFunctionTransitionGraph;
    friend class CFunctionTransitionParser;
public:
    // constructor, destructor
    CFunctionTransition (TInt aTransitionId,
                void *aParam = NULL,
                TInt aTransitionvalue = KErrNone,
                TActiveTestEvent * aEvent = NULL);
    virtual ~CFunctionTransition( );
    // methods
    virtual void SetContext(void* aContext);
    virtual SetEvent (TActiveTestEvent * a Event = Null);
    void SetTimeout (Tint a Timeout);
    void SetValue (TInt a Value);
    inline TBool IsNop( );
    // implemented function transition interface
    virtual TActiveTestEvent * GetTestEvent( );
    virtual TBool Invoke( );
    virtual void PrintLn (TLogMask aMask = ELogStep);
    virtual void PrintLn (TLogMask aMask = ELogStep);
    virtual void PrintDataLN (TLogMask aMask =ElogStep);
protected:
    Tint        iTransitionID;   // defined on a base class below
    Tint        iValue;          // Value for transition result
    void        *iParam;         // transition parameters
    void        *iContext;
    Tint        iTimeout;        // timeout value in ms
    TActiveTestEvent *iEvent;    // Event to wait on
};
```

This class encapsulates one function transition: it contains one (1) action (iTransitionId, iParam, iValue, iContext), and one (1) event to wait on (iEvent, iTimeout). iTransition and iParam specifies the actual action to be performed by this function transition. iContext is a pointer to a object or structure that needs to be referenced by the action (e.g. the test scenario), iValue is the expected return value for the action. iTimeout is the default timeout for the event, it is not used if the event is a timer event.

The semantics of a function transition is that first the action is executed and then we wait for the event. Each transition can have a default event which is set by GetTestEvent( ).

The base class implements the ETrTimer (wait for timer) transition with EEventTimer it's default event.

This class is used to construct a function transition (via constructor). The other methods are to be used by the function transition parser; although, they can be used when manually creating the objects. The event, timeout and expected value can be changed during initialization using the Set Event, SetTimeout and SetValue methods. Note that SetEvent does not support NULL as input, and a null event must be specified explicitly (EvNull).

When extending this class, one has to overwrite the following functions:

SetContext: it sets the context based on the argument—can freely define the meaning of the context and how it is used.

GetTestEvent: returns the test event for the transition. If the "default event" is specify, it resolves the event to default event for the transition before returning.

Invoke: performs the action in the function transition and returns the result.

For debug purposes, one also may overwrite the following functions:

PrintLn and PrintDataLn: prints out the transition and the transition and the transition data (iParam).

2. CFunctionTransitionGraph (Base Class)

CFunctionTransitionGraph is the container class for the transition graph (list). It implements a CallBackL function that can be used by function transition based scenarios. Note: one can perform background event processing outside what is defined by the transition graph before calling the transition graph's Callback. One example for this is queuing buffers during streamed media play, which is normally not handled in a transition list. To implement this, one can handle the buffer request events in the test application, and route any other event through the provided CallbackL method.

```
Class CFunctionTransitionGraph : public CBase
{
protected:
    // instance variables
    CActiveTest ScenarioBase    *iScenario;    // scenario for error
Reporting
    void                *iCurContext;
    TActiveTestEvent    *iCurEvent;            // current event
    TInt                iCurIx;                // current transition index
    TBoo                l iInvoking;           //invoking a transition
        currently
    RArray              <CFunctionTransition*> iTransitionGraph;
    RArray              <CFunctionTransitionParser*>iParsers;
Public:
    // constructor, destructor
    CFunctionTransitionGraph (CActiveTestScenarioBase *a Scenario);
    virtual ~CFunctionTransitionGraph( );
    // methods
    virtual void SetContext (void *a Context);
    TBool Add (CFunctionTransition *aTransition, TBool a
    SetContext = ETrue);
    TInt ParseL (Tint argc, TText * argv[ ], Tint &aStartIndex);
    void AddParser (CFunctionTransitionParser * aParser);
    void RemoveParser (CFunctionTransition Parser *aParser);
    TBool CallbackL (TActiveTestEvent &aEvent);
    virtual void Print (TLogMask aMask = ELogStep);
```

-continued

```
protected:
    CFunctionTransition * ParseTransitionsL (Tint argc, TText *argv[ ],
                                             Tint & aStartIndex);
};
```

It also works together with function transition parsers to parse a function transition graph from the arguments. Parsers can be added and removed by the AddParser, and RemoveParser methods. This allows using actions and events from several function transition classes.

Function transition graphs can be created in 2 ways: from the command line, and from a C++ method. Command line parsing (using ParseL) allows test scenario creation without compiling and linking. We will detail the operation of the Parser.

The SetContext and Add methods allow constructing a transition graph from the code. Since the context tends to be the same for most function transitions, a default context can be specified using SetContext. This can be updated ongoingly for subsequent function transitions.

Add takes in a function transition, and adds it to the end of the function transition list. If aSetContext is true, the default context is used. Otherwise, the context must be set manually, which is tedious because it has to be done on the function transition object:

CFunctionTransition *f1=new CFunctionTransition( . . . );

f1→SetContext (context);

graph→Add(f1, EFalse);

Versus:

graph→SetContext(context);

graph→Add(new CFunctionTransition( . . . ));

3. CFunctionTransitionParser (Base Class)

```
class CFunctionTransitionParser : public CBase
{
protected:
    // instance variables
    void        *iContext;
public:
    // constructor, destructor
    CFunctionTransitionParser(void *aContext);
    ~CFunctionTransitionParser( );
    // methods
    inline void SetTransContext(CFunctionTransition *trans);
    inline void *GetContext( );
    // implemented transition parser interface
    virtual CFunctionTransition *ParseL(TInt argc, TText *argv[ ],
                                        TInt &aStartIndex);
    virtual TActiveTestEvent* ParseEventL(TInt argc, TText *argv[ ],
                                          TInt &aStartIndex);
};
```

The function transition parser parses transitions of the CFunctionTransition class. It can be subclasses to parse transitions for classes derived from CFunctionTransition. It is used by CFunctionTransitionGraph. The base class parses only timer transitions and events. The parse interface consists of two methods: ParseL and ParseEventL, to parse a transition and an event related to a class of function transitions. Note, that in the transition graph you can freely mix events and actions from different function transition classes. E.g. start playing a video stream and wait for an audio stream event. The function transition parser parses transitions of the CFunctionTransition class. It can be subclasses to parse transitions for classes derived from CFunctionTransition. It is used by CFunctionTransitionGraph. The base class parses only timer transitions and events. The parse interface consists of two methods: ParseL and ParseEventL, to parse a transition and an event related to a class of function transitions. Note, that in the transition graph you can freely mix events and actions from different function transition classes. E.g. start playing a video stream and wait for an audio stream event.

The Transition-Graph Test Model Implementation

In the transition-graph test model, the following state is kept:
- iCurEvent: the current event to wwait for (NULL if a null event)
- iCurix: the current index in the transition list
- iInvoking: invoke flag-true if currently invoking an action The CallBackL method takes in the received event (aEvent) as argument.

Figure 9:
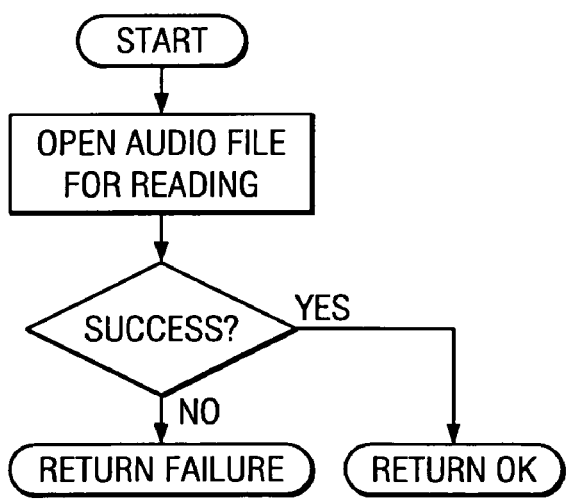
FIG. 9 illustrates TestScenario1::Initializel.

Referring to FIG. 9 the CallBack has four parts:

1. The initial event is handled first which determines if an event is received and if so is it the first event. If not it fails.

2. We then verify the event is the expected event (iCurEvent=a Event) (fail if it isn't), and set it to null (we use it up).

3. Invoke loop: we process any actions that can be taken-note, the callback can be called while invoking an action. If no event is specified we invoke the next action immediately, until we are done, or an event is specified. We set the specified event as the next expected event.

4. One determines whether the test case has completed (success) or need to continue.

If the callback is called while invoking:

1. One makes sure it is the Init event.

2. Verify the event is the expected event, one sets the expected event to null (one uses it up)

3. If the next action is null, one sets the expected event to its event; otherwise, one leaves it null.

4. One continues (invoking).

5. NOTE: When the invocation returns, the expected event will be the next event to wait for, or null. In the latter case (as expected), the next action will be immediately invoked, since we have already received the event for the just completed transaction.

Transition-graph Parsing and Creation.

The transition graph is parsed from the argument list in CFunctionTransitionGraph::ParseL using the following process:

1. Find starting '[' token (which marks the beginning of the transition list.

2. From this one loops through each argument until the ']' token or the end of the arguments (whichever comes first). One keeps track of the position in the argument list using an argument pointer.

3. If the current argument is:

a. the "Loop" token, one reads the next argument (the loop counter), and push the current argument index and the loop counter onto the loop stack.

b. The "Next" token, one pops the loop counter off the loop stack.

i. If it is zero, one pops the argument index as well and simply continues.

ii. Otherwise, one checks the argument index at the top of the loop stack, and moves the argument pointer to that index.

One decreases the loop counter and pushes it back onto the top of the loop stack.

c. Else, one calls ParseTransitionL to parse the next transition in the list, and add it to the transition list.

4. If the loop stack is not empty, one fails (this means that some loops were not closed.)

5. Also, if any operation fails, e.g. parsing arguments or transitions, one fails.

CFunctionTransitionGraph::ParseTransitionL parses (or tries to parse) the next transition from an argument list. It's inputs are the argument list, and the current index. The parsing uses the following process:

1. Loop through each transition parse, and see if any of them can parse the transition. If none can, one fails. If one succeeds, the index should point just after the transition and its arguments in the argument list. Note that one will use the first successfully parsed transition, in case more than one parsers could parse a transition.

2. Set the context of the parsed transition using the parser that successfully parsed it. (Each parser can have its context that it applies to the transition).

3. Loop through each transition parser, and see if any of them can parse an event (which can optionally follow the transition in the argument list). If any of them can, one sets the event of the transition to the parsed event. Note that one will use the first successfully parsed event, in case more than one parsers could parse the event.

4. See if the expected return value is specified for the transition. If yes, parse it.

5. See if a timeout is specified for the transition. If yes, parse it.

The transition parsers simply compare the next argument at the argument index to specific transition/event tokens. If the tokens match, they try to parse required arguments for that transition/event following the token. When the parse is successful, then move the index after the transition/event.

ETransitionType Enumeration

ETransitionType enumeration defines the transition operations supported by the framework.

```
enum ETransitionType
{
    ETrNOP = 0,         // no transition
    ETrTimer,           // timer wait
    ELastFnTransition,
};
```

V. The Instance-Aware Event-Driven Test Framework

Figure 19:
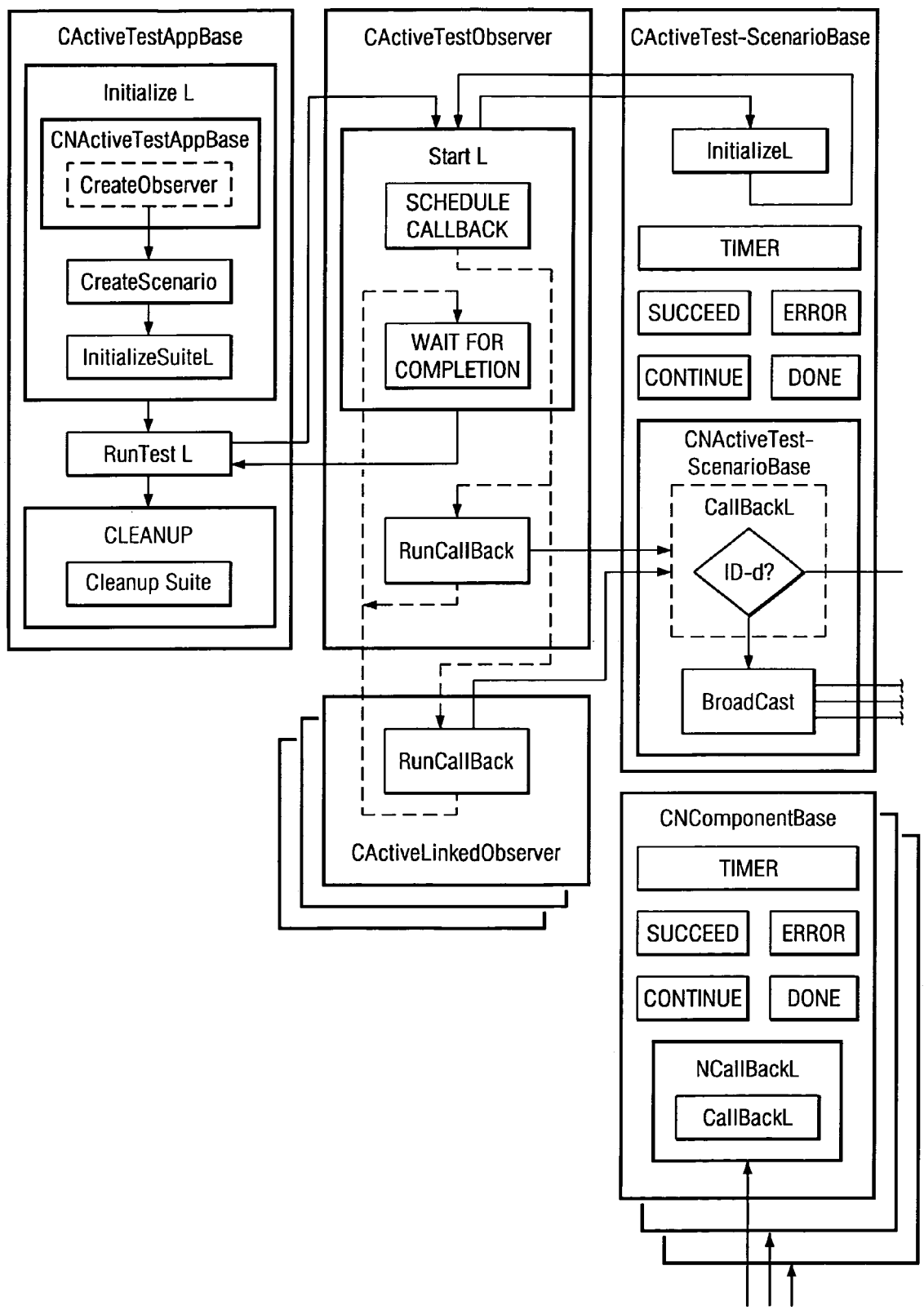
FIG. 19 illustrates the instance-aware event-driven test framework.

The Instance-Aware Event-Driven Test Framework extends the Event-Driven Test Framework (1) to support multiple instances of multiple components. Components are a collection of one or more of the same even-driven objects/interfaces, e.g. an audio player object or a camera object. Each object in the component is an instance of that component. Events are routed to the target component (and Instance). They can also be broadcast to all instances of all components. Each instance of each component is tagged with a unique instance ID. Instance IDs for components start from 1. Event received with Instance ID( ) are broadcasted. They are sent to all existing instances. FIG. 19 illustrates the test execution model for the instance-aware event-driven test framework. It has four classes: The component base (CNComponentBase), the test application base (CNActiveTestAppBase), the test scenario base (CNActiveTestScenarioBase) and the linked test observer (CActiveLinkedObserver). It also defines on data type: the instance-aware test event (TNActiveTestEvent).

Interfaces

The instance-aware event-driven test framework defines an interface of 4+2+1 methods (hooks) that must be implemented by framework users. 4 methods are specific to the test application, 2 methods are specific to test components, and 1 method is specific to each test scenario implemented by the test application. This latter can vary from one test scenario to another one. The test-suite specific interface is inherited from the event-driven test framework:

CreateObserver is implemented (but can be overwritten).

CreateScenario, InitializeSuiteL and CleanupSuite are yet to be implemented.

These 2 methods provide test component specific customization:

CreateObserver: this method must create and return the test observer for a component instance.

CallBackL: the test components callback method (all events are routed to the targeted test component and instance). This method is called in response to an event in the system specific to one of the instances of the component, and it must return true only at the end of the test (whether it succeeds or fails). At all other times it must return false. Note: Testing is stopped at the first true return value if there is also an error-result; however, if no error is set (successful completion), other component instances may continue to process events until CallBackL returns true for those instances. Alternatively, testing can be set to stop at the first true return value regardless of the error value.

In addition, the scenario objects must implement the InitializeL method (also from the event-driven test framework).

Classes

The Instance-Aware Event-Driven Test Framework has 4 classes: the instance-aware test-application base (CNActiveTestAppBase), the instance-aware test-scenario base (CNActiveTestScenarioBase), the component base (CNComponentBase) and the linked test observer (CActiveLinkedObserver). It also defines one data type: the instanced test event (TNActiveTestEvent).

Classes

1. TNActiveTestEvent (Data Type, Extends TActiveTestEvent)

The TNActiveTestEvent class extends the event base claims with instance ID, meaning that the event was generated by the specific instance. It also supports the Sync and TimeOut events. Sync events have a tag (iData), and are usually broadcast to all instances. They can be used to synchronize instances. Note, as most instances will not be waiting for a Sync event, it should be a notification (iNotification=True). Regular TActiveTestEvents are "upgraded" with instance ID 0. This is done by checking the event type (iType) in CNActiveTestScenarioBase's CallBackL method. Therefore, all custom instanced event types must start from ELastNActiveEvent. The new comparison method now compares the instance ID's as well.

```
Class TNActiveTestEvent : Public TActiveTestEvent
{
public:
    // instance variables
    TInt        iInstanceId
    Tint        iData;
    // constructor/ destructor
    TNActiveTestEvent (Tint aType, Tint aInstanceId, Tint aData = 0 );
    ~TNActiveTestEvent( );
    /overwritten methods
    virtual TBool Matches (TActieTestEvent & aEvent);
    virtual void Print (TLogMask aMask= ELogEvent);
};
```

2. CNComponentBase(Base Class)

CNComponentBase implements the basic operation of components and acts as a base type for all tested component types. Upon construction (ConstructL), the maximum number of instances expected must be specified. This also reserves a range of instance IDs for the objects (from the test scenario). Then each instance can be created using CreateInstance, which returns an instance Id. Implementations of CreateObserver, ConstructL and CreateInstance are provided for derived classes to build upon. NCallBackL is implemented, and extends CallBackL such that it only returns True ONCE for the component (for all Instances). CallBackL must be defined, and it must handle a callback for a specific instance. It must return True ONCE for that instance. The variable iFirstInstance is the instance ID of the first instance of this component. All instance ID-s as arguments start from this ID. This allows easy integration of components. E.g. you can have one audio/video-decoder combo component which uses an instance of both the audio-decoder and the video-decoder component bases. Since each instance has a unique ID, events can be simply propagated to the appropriate sub-component. A translation with error checking (LocalIx( )) is provided to translate from instance ID to local-index [0 . . . (number of instances−1)]. "Copies" of support completion functions—such as Done, Succeed, Error, Continue—as well as instance-specific timer scheduling (Timer) are provided, since most of the test scenario will be implemented in a component class derived from this base class. The rest of the functions are used by the scenario class to ensure proper routing of events and completion of the test case. To ensure that there is an outstanding timer request for each instance, and to still allow instances to request a timer event at a specific time, we support reserved and unreserved scheduling of the timer. Unreserved requests are ignored if there is a reserved timer already scheduled. Reserved requests overwrite (cancel and reschedule) any prior timer request.

```
class CNComponentBase : public CBase {
Protected:
    // instance variables
    TInt iNumInstancees;      // instances reserved (max)
    TInt iCurInstance;        // instances allocated
    TInt iFirstInstance;      // starting instance Id
    TInt iNUMActive;          // active instances (not yet succeeded)
    CActiveLinkedObserver     **iObservers;
    CActiveTestObserver       *MainObserver;
    CNActiveTestScenarioBase  *iTestScen;
    TBool                     *iCompleted;
    TBool                     *iInCallBack;
    TBool                     iAlive;
Public:
    // constructor/destructor
```

-continued

```
CNComponentBase (CActiveTestObserver * a Observer);
virtual ~CNComponentBase ( );
void ConstructL (Tint aNumInstances,
// observer (getter) methods
inline TInt NUMInstances( )
inline TInt MaxInstances( )
//helper methods
inline TInt LocalIx (Tint aInstance);
inline TBool Done (TInt a Result);
inline TBool Succeed ( );
inline TBool Error (TInt aError);
inline TBool Continue( );
// methods
TInt CreateInstance( );
Tbool NCallBackL (TNActiveTestEvent & aEvent);
TBool Completed (TInt iInstanceId);
inline TBool Timer (TInt iInstanaceId, TInt ms,
              TBool a Reserved= EFalse);
// component interface method
virtual TBool CallBackL (TNActiveTestEvent & aEvent)=0
// implemented component interface method
virtual CActiveLinkedObserver * CreateObserver (TInt iId);
};
```

3. CActiveLinkedOberver (Base Class)

CActiveLinkedObserver serves as observer for an individual instance (marked by iInstanceId). This allows specifying instance specific timeouts in the system. The linked observer also allows setting reserved and unreserved timer requests (timeouts). Reserved timer requests overwrite any already pending timer request, while unreserved ones do not. This functionality is needed if certain events are handled in the background, as there always must be an outstanding timer request. In this way main event time outs are not modified. Component-specific observers must be derived from this class.

```
Class CActiveLinkedObserver : public CActiveObserver, public CTimer {
    // instance variables
    CActiveTestObserver * iLinkedObserver;
Protected;
    Tint    iInstanceId;
    TBool   iReserved;
Public:
    // constructor/destructor
    CActiveLinkedObserver (TInt aInstanceId
              CActiveTestObserver *aObserver,
              TInt a Priority = CActive : : EPriorityStandard);
    virtual ~CActiveLinkedObserver( );
    //methods
    inline TBool Timer(TIt ms, TBool aReserved = EFalse);
    // implemented callback interface
    virtual void RunCallBack (TActiveTestEvent & aEvent);
private:
    virtual void RunL ( );
};
```

4. CNActiveTestScenarioBase(Abstract Base Class, Extends CActiveTestScenarioBase)

This CNActiveTestScenario base extends the event-driven scenario base and supplies a few hooks and methods. It provides support for multiple components and allocating instance IDs using the AddComponent ( ) method, which is automatically called during construction. AddComponent registers a component with the scenario (so that callbacks and broadcasts will be routed to the target component/instance. It also keeps track of active components (with one or more instances "operating"). This is used if testing is to continue until all components have finished their test phase. Alternatively, testing can halt as soon as the first component completes testing. It also implements event Broadcast ( ) which send an event to all currently existing instances. CallBack is implemented, and it routes instance-aware events to the correct component. It broadcasts non-instance-aware events (e.g. start event) to all components. ADDComponent registers a component with the scenario (so that callbacks and broadcasts will be routed to the target component/instance). One also keeps track of active components (with 1 or more instances still "operating"). This is used if testing is to continue until all components have finished their test phase. Alternatively, testing can halt as soon as the first component completes testing. It also implements event broadcasting via Broadcast( ), which sends an event to all currently existing instances. CallBackL is implemented, and it routes instance-aware events to the correct component. It broadcasts non instance-aware events (e.g. start event) to all components.

```
Class CNActiveTestScenarioBase : public AActiveTestScenarioBase {
    // instance variables
    RArray<CNComponentBase *> iComponents;
    TInt    iCurInstanceId;
    Tint    iNumActive;         // active components
public:
    // constructor/destructor
    CNActiveTestScenarioBase( );
    virtual ~CNActiveTestScebarioBase( );
    //methods
TBool Broadcast (TNActiveTestEvent & aEvent);
    TInt ADDComponent (CNComponentBase * aComp);
    inline void ActivateComponent ( )
    inline void DeactivateComponent( )
    // implemented 2-phase interface
    virtual TBool CallBackL (TActiveTestEvent &aEvent);
};
```

5. CNActiveTestAPPBase(Abstract Base Class, Extends CActiveTestAPPBase)

```
Class CNActiveTestAPP Base     :     public CActiveTestAPPBase
{
protected:
    virtual CActiveTestObserver    * CreateObserverL( );
    ~CNactiveTestApppBase ( );
    CNActiveTestAPPBase( );
};
```

Instance-aware test applications always use a standard CActiveTestObserver as their main observer, since all other observers are instance specific. Thus, one implements CreateObserverL. The three remaining test-app interfaces are yet to be implemented by the framework user. There is no additional visibility to the instance-aware framework.

Figure 20:
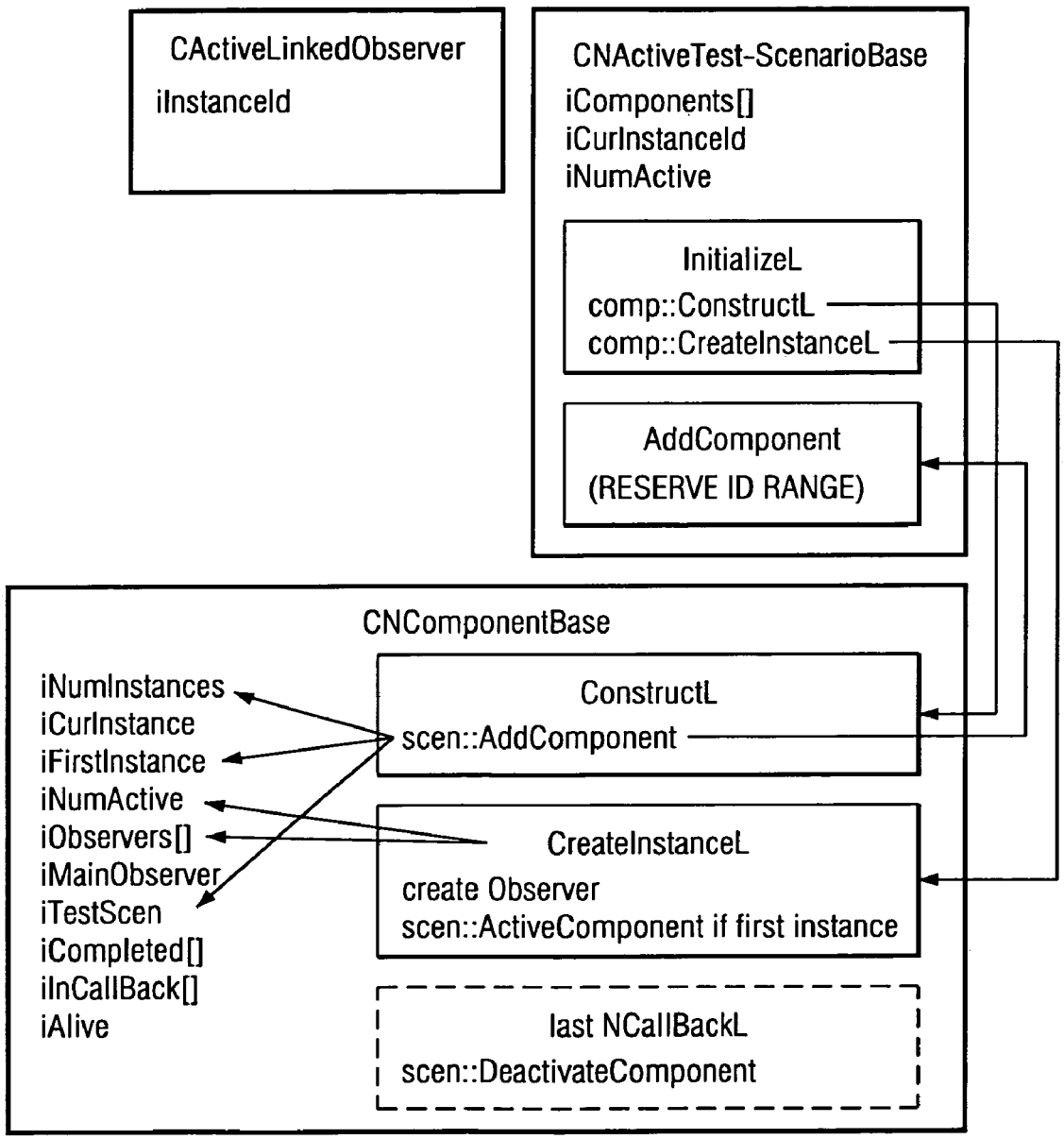
FIG. 20 illustrates access to other test objects during construction.

Access to other test objects is provided during construction as illustrated in the following FIG. 20. Scenario's InitializeL method:

1. During the scenario" initialization, the components are created.
2. The main observer and the test scenario is passed to the component in the constructor:
   a. The component reserves a range of IDs calling the scenario's ADD Component method. It gets back a starting ID.
   b. The number of supported instances are stored away as well, and all arrays are created.
   c. We mark the component as alive.

3. The specific instances of components are created calling the CreateInstanceL method:
   a. If it is the first instance, the component activates itself by calling the Scenario's ActivateComponent method (we keep track of the number of active components so that we can tell when all components have completed).
   b. We create the observer for the instance (passing in the instance ID to the observer).
   c. We initialize the instance specific variables.
   d. We increase the number of instances.
   e. We increase the number of active instances. (We keep track of this so that we can tell when all instances have completed).

Event/CallBack Routing

Events are created in the instance specific observers (which assign IDs to the events). Then they are passed into the event flow, using the observer's RunCallBackL method. They are routed to main observer's RunCallBackL method, which calls the Scenario's CallBackL method. This is implemented for instance-aware scenarios. Depending whether the event has an ID attached to it, it is routed to the specific component's NCallBackL, which includes the instance ID in it's range of IDs. If the event has no ID attached to it, it is broadcasted to all existing instances of all components through their NCallBackL method. The component's NCallBack method checks if the specific instance has already completed, in which case the flow stops. Otherwise, the component specific CallBack is called-which must be implemented. During the callback, we set the InCallBack flag for the instance true. (One needs this flag to ensure that all testing for all component instances have completed.) If CallBackL returns True (e.g. success or failure), the instance is marked complete and deactivated. If all instances completed, or the test failed (which is already signaled to the main observer by this time), the component returns true IF and only If it is still alive, and sets the alive flag to false. If there are still remaining instances (and the test hasn't yet failed), one marks the test result as inconclusive. (Note: One keeps the last completing instance's test result). If the component's NCallBackL returns true, one deactivates the component. If all components completed, or the test failed, then the scenario returns true (Note: this only happens once). Otherwise one sets the test result to No-Result-Specified, and returns false (as there are other instances that need to complete). Otherwise, one returns false.

TNActiveTestEventType Enumeration

TNActiveTestEventType enumeration defines the additional event types supported by the framework.

```
enum TNActiveTestEventType
{
   EEventSync = ELastActiveEvent,
   EEventTimeOut,
   ELastNActiveEvent,
};
```

VI. Using the Instance-Aware Event-Driven Test Framework

Events can be filtered by overwriting CNComponentBase's (or the implemented CIdFnTransComponent's) CallBackL method. This allows checking the event's details before calling CallBackL if needed:

```
CMyIdFnTransComponent::CallBackL(aEvent)
{
   // skip unwanted event (MUST schedule timer)
   IF (aEvent should be ignored)
   THEN Return Timer(default timeout, unreserved).
   // process all other events
   Call and Return CIdFnTransComponent->CallBackL(aEvent).
}
```

This can be generalized with a Filter method.

```
TBool FilterEventA(reference to aEvent)
{
   // skip unwanted event (MUST schedule timer)
   IF (aEvent should be ignored) THEN
   {
      Timer(default timeout, unreserved);
      Return True.
   }
   Return False.
}...
CMyIdFnTransComponent::CallBackL(aEvent)
{
   IF (FilterEventA(aEvent) ) THEN Return False.
   Call and Return CIdFnTransComponent->CallBackL(aEvent);
}
```

New events can be added by adding an observer interface, triggering events or altering events. To add an observer interface create an observer class derived from CActiveLinkedObserver and the observer interface. In each observer callback, create the appropriate event, assign the instance ID (iId), and call RunCallBackL( ) method. One can trigger an event by calling the test scenario's or the component's CallBackL or NCallBackL methods. However, this will be always in the context of another event, as the execution of any test scenario code is triggered by a previous event. One can use a Filter method to change an event to another event. E.g. the following method triggers event C after a specified number of B events.

```
TBool FilterEventB(reference to aEvent)
{
   // skip unwanted event (MUST schedule timer)
   IF (aEvent is of type B) THEN
   {
      Decrement eventB counter.
      IF (eventB counter is 0) THEN
      {
         Store event C in aEvent.
         Return False.
      }
      // otherwise, ignore event
      Timer(default timeout, unreserved);
      Return True.
   }
   Return False.
}
```

Figure 21:
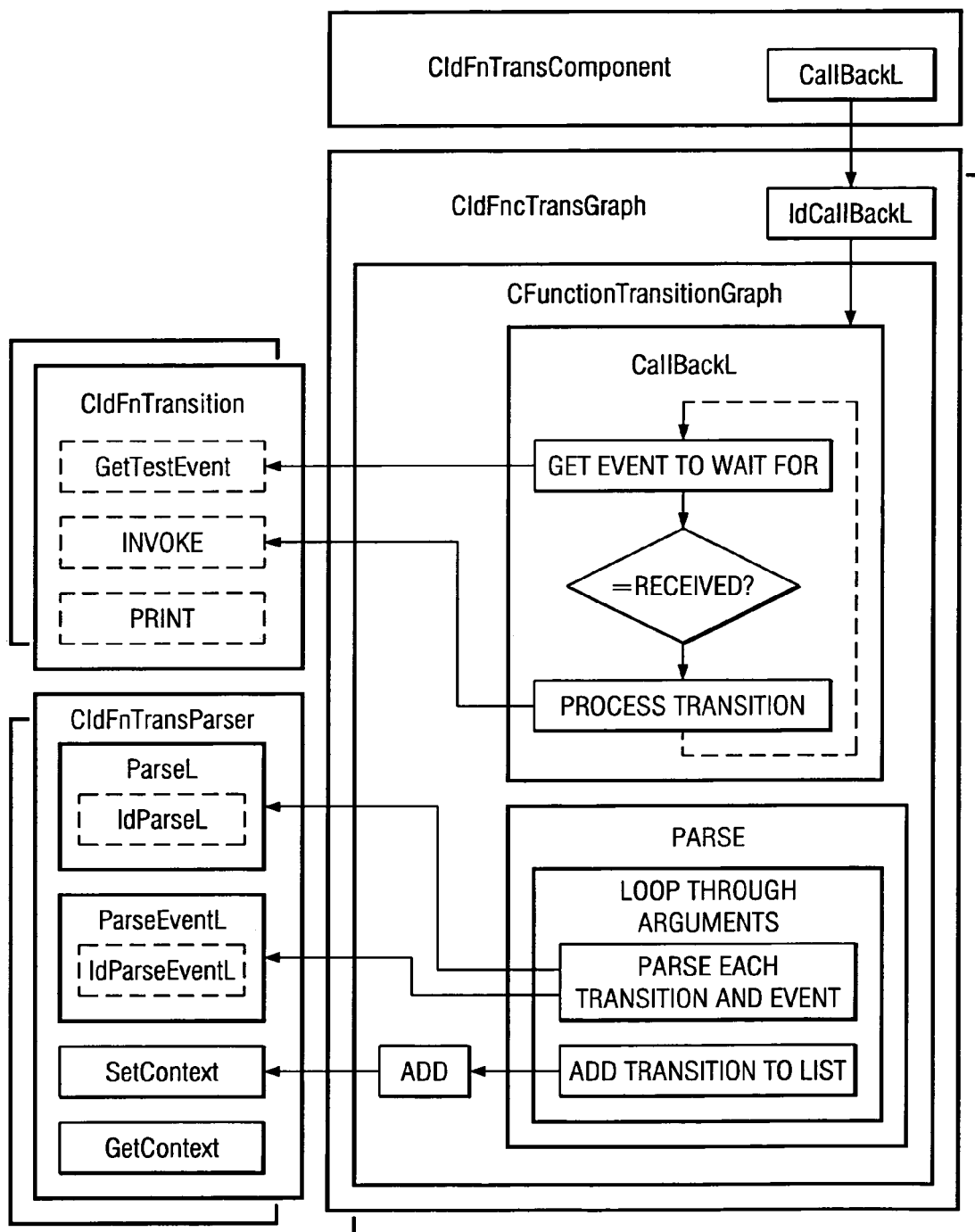
FIG. 21 illustrates transition-graph test model for instance-aware event-driven test framework.

VII. Transition-Graph Test Model for the Instance-Aware Event-Driven Test Framework This Transition-graph Test Model extends the one for Event-Driven test by adding support for multiple transition graphs, and for parsing multiple instances of a component. In addition, it implements the CallbackL method for the component base. FIG. 21 illustrates this model.

Classes

The Transition-graph Test Model for the Instance-Aware Event-Driven Test Framework has 4 classes: the instanced transition class (CIdFnTransition), the instanced transition graph class (CIdFnTransGraph), the instanced transition parser class (CIdFnTransParser) and the instanced transition-graph component class (CIdFnTransComponent). It also defines one data structure: the instanced context (CIdFnTransContext), which is used internally only.

1. CIdFnTransContext (Data Structure)

```
struct CIdFnTransContext
{
  // data members
  TInt iId;
  CIdFnTransComponent *iComponent;
};
```

CIdFnTransContext data structure contains information that is needed by instanced transitions to access their component object (iComponent). This is used as the context for transitions.

2. CIdFnTransition (Base Class, Extends CFunctionTransition)

```
class CIdFnTransition    :    public CFunctionTransition
{
protected:
  // instance variables
  TInt iId;
  // additional friend classes
  friend class CIdFnTransParser;
public:
  // constructor/destructor
  CIdFnTransition(TInt aTransitionId,
          void *aParam = NULL,
          TInt aTransitionValue = KErrNone,
          TNActiveTestEvent *aEvent = NULL);
  CIdFnTransition( );
  // extended methods
  virtual void SetEvent(TNActiveTestEvent *aEvent);
  // overwritten methods
  void SetContext(void *aContext);
public:
  // implemented transition interface
  virtual TActiveTestEvent* GetTestEvent( );
  virtual void PrintLn(TLogMask aMask = ELogStep);
  virtual void PrintDataLn(TLogMask aMask = ELogStep);
  virtual TBool Invoke( );
};
```

This class extends the transition class by an instance ID (iId). SetContext is overwritten to handle a CIdFnTransContext structure as context, SetEvent now requires an instanced event. The default transition implementation supports a tagged synchronization event (EEventSync<tag>), which can be broadcasted to all instances. Instances can wait for this event with a specific tag. Moreover, the timer scheduling transition is reimplemented as EErTimer, which now use independent timers for each instance.

3. CIdFnTransGraph (Base Class, Extends CFunctionTransitionGraph)

```
class CIdFnTransGraph    :    public CFunctionTransitionGraph
{
  // instance variables
  TInt cRef;
  RArray<CIdFnTransContext> iInstances;
public:
  // constructor/destructor
  CIdFnTransGraph(CNActiveTestScenarioBase *aScenario);
  virtual ~CIdFnTransGraph( );
  // methods
  inline TBool Timeout(TInt iId, TInt ms, TBool aReserved=EFalse);
  virtual TBool IdCallBackL(TNActiveTestEvent &aEvent);
  // overwritten methods
  virtual void SetContext(void *aContext);
  TInt ParseL(TInt argc, TText *argv[ ], TInt &aStartIndex);
  // helper methods
  inline TInt References( );
  inline TInt Dereference( );
};
```

This class contains few changes to CFunctionTransitionGraph. In a multi-instance environment, there may be multiple transition graphs. An instance can only refer to ONE transition graph (to ensure event routing); however, several instances can share a common transition graph. To ensure proper automatic deletion of the graph, we keep track of the number of instances that refer to it (cRef). The Reference and Dereference methods increase and decrease this counter respectively. iInstances keep track of all the instances that refer to this graph. This is used to ensure termination of all instances associated with the graph. Additionally, this information is needed by the new Timeout method, which schedules a timer event for all instances using the graph. For reserved timeouts (e.g. Timer transition), the instance requesting the timer will schedule its timer to the requested duration. All other instances schedule their timer 1 second later. This ensures that the instance's Timer event will be called first, thus avoiding a not-expected event error. The TransitionGraph's CallBackL method is now wrapped in IdCallBackL, which now requires an instanced event. This ensures that we use instanced events throughout the instanced transition model. SetContext extends the CFunctionTransitionGraph's SetContext by adding the instance (from the context) to the iInstances array.

4. CIdFnTransComponent Class, Extends CNComponentBase

```
class CIdFnTransComponent    :    public CNComponentBase
{
  // friend classes
  friend CIdFnTransition;
protected:
  // instance variables
  CIdFnTransGraph **iGraphs;
public:
  // constructor/destructor
  CIdFnTransComponent(CActiveTestObserver *aObserver);
  virtual ~CIdFnTransComponent( );
  void ConstructL(TInt aNumInstances, CNActiveTestScenarioBase *aTestScen);
public:
  // implemented component interface method
  virtual TBool CallBackL(TNActiveTestEvent &aEvent);
  // extended methods
  TInt CreateInstance(CIdFnTransGraph *aGraph);
  // overwritten methods
```

-continued

```
    inline TBool Timer(TInt iInstanceId, TInt ms, TBool
aReserved=EFalse);
};
```

CIdFnTransComponent class implements the CallBackL method for an component using the instanced transition-model. CreateInstance now requires passing in the function transition graph associated with the instance, which is stored in the iGraphs array. All transition graphs passed into CreateInstance will be deleted upon completion. The CallBackL will call the IdCallBackL method on this graph. Note: classes deriving from this class can override the CallBackL method to handle component-specific background event handling. For example, when testing streaming media decoders, the buffer-request event would be handled outside the transition graph. Also, one can insert events in response to a background event such as, for example, an event when a certain number of buffers have been queued. This can be implemented as follows:

```
    MediaStreamingComponent::CallBackL (aEvent){
        If (aEvent is a Buffer-Request_Event) {
            Provide buffer to MediaStream
            Increase buffer-counter
            If (buffer-counter has not yet reached the limit){
                Return false
            }Else{
                Set aEvent to Buffers_Queued event
            }
        }
        Call CallBackL of the parent class (CIdFnTransComponent)
    }
```

Furthermore, the Timer method now schedules a timeout for all instances associated with the graph (and not just this instance), using the transition-graph's Timeout method.

5. CIdFnTransParser (Base Class, Extends CFunctionTransitionGraph)

```
class CIdFnTransParser : public CFunctionTransitionParser
{
public:
    // constructor/destructor
    CIdFnTransParser(const TDesC &aTag);
    CIdFnTransParser( );
    virtual ~CIdFnTransParser( );
    // methods
    void SetTagL(const TDesC &aTag);
    // extended methods
    void SetContext(CIdFnTransComponent *aComponent, TInt aId);
    // implemented parser interface
    virtual CFunctionTransition* ParseL(TInt argc, TText *argv[ ],
            TInt &aStartIndex);
    virtual TActiveTestEvent* ParseEventL(TInt argc, TText *argv[ ],
            TInt &aStartIndex);
    // implemented instance-aware parser interface
    virtual CFunctionTransition* IdParseL(TInt argc, TText *argv[ ],
            TInt &aStartIndex);
    virtual TNActiveTestEvent* IdParseEventL(TInt argc, TText *argv[ ],
            TInt &aStartIndex);
protected:
    // instance variables
    const TDesC *iTag;
};
```

This class extends the transition-parser class by allowing to add an optional tag for each parser. This allows differentiating identical parsers belonging to different instances, e.g. in case a transition contains several instances of a component. This extra flexibility is achieved by moving the parser-interface from ParseL and ParseEventL to IdParseL and IdParseEventL respectively. ParseL and ParseEventL check to see if the argument at the current index start with the parser's tag, and if it does, they temporarily remove the tag before calling IdParseL/IdParseEventL. The argument is restored before returning from ParseL/ParseEventL. The base implementation supports only the "T" (timer), "Sync" (synchronization) and the "Wait:" (for synchronization) transitions.

EIdTransitionType Enumeration

This enumeration defines the additional instanced transition operation values.

```
enum EIdTransitionType
{
    ETrSync = ELastFnTransition,    // signal synchronization
                                    semaphore
    ETrDone,                        // completion transition
    ELastIdTransition,
};
```

The invention claimed is:

1. An apparatus comprising an event-driven test framework for running tests in an event-driven fashion, wherein the event-driven test framework comprises:
    a test application base class that implements an external test execution interface and defines an event-driven test application interface to be implemented by a user of the event-driven test framework, wherein the event-driven test application interface comprises a hook for user-implemented creation of a test scenario object, a hook for user-implemented creation of a test observer, a hook for user-implemented initialization of a test suite and a hook for user-implemented cleanup of a test suite;
    a test scenario base class that defines an event-driven test scenario interface to be implemented by a user of the event-driven test framework, wherein the event-driven test scenario interface comprises a hook for user-implemented initialization of a test scenario and a hook for a user-implemented callback method for a test scenario and implements a callback timer;
    a test observer base class that implements scheduling of event-driven tests and provision of timer and initialization events to a test scenario; and
    a transition-graph test model, comprising:
        a transition base class that encapsulates one transition of one event and one event to wait on;
        a transition graph base class for a transition graph that implements a callback method for testing scenarios and for working with transition parsers to parse a transition graph; and
        a transition parser base class implementing parsing of transitions derived from the transition base class.

2. The apparatus of claim 1, wherein the event-driven test framework further comprises:
    a test event data structure that encapsulates data regarding each event; and
    a base class for an event type that supports the initialization and timer events and defines comparison matches.

3. The apparatus of claim 2, wherein the event-driven test framework further comprises:
an observer interface that defines a callback signature to call a user-implemented callback method of a test scenario.

4. The apparatus of claim 1, wherein the the transition-graph test model implements a linear transition-graph test model for testing wherein transitions are triggered by events and at each transition an event and an operation is specified.

5. The apparatus of claim 4 wherein both events and operations can be a null where no operation or wait is performed.

6. The apparatus of claim 4, wherein the transition-graph test model further comprises:
a user-customizable transition interface that returns a test event associated with a transition object;
a user-customizable transition interface that performs a transition for a transition object; and
a user-customizable transition interface that prints details of a transition object.

7. The apparatus of claim 6, wherein the transition graph test model further comprises:
a user-customizable parsing interface that checks if there is a recognized and valid transition in an argument list at a specified index and if there is one, advances the index to an end of a transition description, and returns the transition object and otherwise keeps the index in place and returns null.

8. The apparatus of claim 3, wherein the event-driven test framework further comprises:
means for supporting multiple instances of multiple components wherein a component is a collection of one or more of a same event-driven object and each object in the component is an instance of that component.

9. The apparatus of claim 8, wherein each instance is tagged with a unique instance ID.

10. The apparatus of claim 9, wherein an event received with an instance ID of 0 is sent to all existing instances.

11. The apparatus of claim 8, wherein the means for supporting multiple instances includes a component base, a test application base, a test scenario base and a linked test observer.

12. The apparatus of claim 11, wherein the component base implements basic operation of components and acts as a base type for all tested components, the test scenario base extends the event-driven scenario base and provides support for multiple components and allocating instance IDs using an add component that is automatically called during component construction, and the linked test observer serves as observer for an individual instance and allows specifying instance specific timeouts.

13. The apparatus of claim 8, wherein the event-driven test framework further comprises:
a transition-graph test model wherein transitions are triggered by events and at each transition an event and an operation is specified and wherein the transition graph test model is configured to support multiple transition graphs and to parse multiple instances of a component.

14. A method of a digital signal processor for testing in a event-driven test framework, the method comprising:
creating a test application using an event-driven test framework, wherein creating the test application includes creating a user-implemented test observer with callback returns for scheduling event-driven tests and creating a user-implemented test scenario with callback returns, wherein the test observer provides timing and initialization of events to the test scenario, and wherein the user-implemented test observer and the user-implemented test scenario are derived from base classes of the event-driven test framework;
running a test using the test observer and test scenario;
executing a user-implemented cleanup method derived from a base class of the event-driven test framework;
encapsulating one transition of one event and one event to wait on;
implementing a callback method for testing scenarios and for working with transition parsers to parse a transition graph; and
implementing parsing of transitions derived from the base class.

15. The method of claim 14, wherein each tested event is captured as a data structure that encapsulates data regarding the event.

16. The method of claim 14, further comprising:
using a transition-graph test model wherein transitions are triggered by events and at each transition an event and an operation is specified.

17. The method of claim 14, wherein the event-driven test framework is instance-aware.

18. The method of claim 16, wherein the event-driven test framework is instance aware and the transition-graph test model supports multiple transition graphs and parses multiple instances of a component.

19. A apparatus comprising an event-driven test framework for running tests in an event-driven fashion, wherein the event-driven test framework comprises:
a test application base that implements an external test execution interface and defines an event-driven test application interface of create scenario, create observer, initialize suite, and cleanup suite;
a test scenario that defines an event-driven test scenario interface of initialize and callback including a callback timer;
a test observer that provides scheduling of event-driven tests and provides timer and initialization events to the test scenario; and
a transition-graph test model wherein transitions are triggered by events and at each transition an event and an operation is specified, wherein both events and operations can be a null where no operation or wait is performed, and
wherein the transition-graph model includes three classes and transition interfaces and parsing interfaces wherein a first class encapsulates one function transition of one event and one event to wait on, a second container class for the transition graph that implements call back function that can be used by function based scenarios and work with transition parsers to parse a function transition graph with the arguments and function transition parser class to parse transitions of the first class and transition interfaces including a first transition interface that must return the test event associated with a transition object, a second transition interface performs the transition for the transition object and a third transition interface prints the details of the transition object.

20. The apparatus of claim 19 wherein the parsing interfaces check if there is a recognized and valid transition in the argument list at a specified index, and if there is one, advance the index to the end of the transition description, and return the transition object, and otherwise keep the index in place and return null.

* * * * *

UNITED STATES PATENT AND TRADEMARK OFFICE
CERTIFICATE OF CORRECTION

PATENT NO. : 7,647,219 B2  Page 1 of 1
APPLICATION NO. : 11/178570
DATED : January 12, 2010
INVENTOR(S) : Overturf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 867 days.

Signed and Sealed this

Twenty-eighth Day of December, 2010

David J. Kappos
*Director of the United States Patent and Trademark Office*